US012184152B1

(12) United States Patent
Brinkley et al.

(10) Patent No.: US 12,184,152 B1
(45) Date of Patent: Dec. 31, 2024

(54) VIBRATION DAMPING APPARATUS FOR MOUNTING AN ELECTRIC ACTUATOR ON A HYDRAULIC DRIVE

(71) Applicant: Hydro-Gear Limited Partnership, Sullivan, IL (US)

(72) Inventors: Jordan J. Brinkley, McCordsville, IN (US); Nathan R. Eversole, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 364 days.

(21) Appl. No.: 17/647,446

(22) Filed: Jan. 7, 2022

Related U.S. Application Data

(60) Provisional application No. 63/136,026, filed on Jan. 11, 2021.

(51) Int. Cl.
*H02K 5/24* (2006.01)
*B60R 11/00* (2006.01)

(52) U.S. Cl.
CPC ............... *H02K 5/24* (2013.01); *B60R 11/00* (2013.01); *B60R 2011/0038* (2013.01); *B60R 2011/0052* (2013.01)

(58) Field of Classification Search
CPC . H02K 5/24; H02K 5/00; B60R 11/00; B60R 2011/0038; B60R 2011/0052
USPC ........................................................ 248/638
See application file for complete search history.

(56) References Cited

U.S. PATENT DOCUMENTS

| | | | | |
|---|---|---|---|---|
| 2,209,477 A | * | 7/1940 | Reibel ...................... | H02K 5/24 74/513 |
| 3,404,485 A | | 10/1968 | Henderson et al. | |
| 3,983,429 A | * | 9/1976 | Allardice, Jr. ........... | H02K 5/24 310/91 |
| 4,667,920 A | * | 5/1987 | Kleineberg ........... | F16F 1/3732 248/68.1 |
| 4,676,473 A | * | 6/1987 | Giles ....................... | F16F 15/08 248/680 |
| 4,877,984 A | * | 10/1989 | Colwell ................... | H02K 5/00 310/212 |
| RE34,064 E | | 9/1992 | Tury et al. | |
| 5,165,867 A | * | 11/1992 | Dockery .............. | F02M 37/103 417/423.15 |

(Continued)

OTHER PUBLICATIONS

U.S. Appl. No. 16/260,942, filed Jan. 29, 2019, 45 pp.

*Primary Examiner* — Taylor Morris
(74) *Attorney, Agent, or Firm* — Neal, Gerber & Eisenberg LLP

(57) ABSTRACT

A vibration damping apparatus for mounting an electric actuator on a hydraulic drive is disclosed herein. A mounting assembly comprises a mounting adapter and a vibration damping clamp. A base plate is coupled to and positioned between a housing of the electric actuator and the drive to mount the actuator housing to the drive. A support arm extends from the base plate and the damping clamp is coupled to a distal end of the support arm. The damping clamp extends circumferentially about a housing of an electric motor of the actuator to secure the electric motor to the drive. A fastener may couple a drive adapter to a trunnion, and a magnet is mounted to the fastener and positioned adjacent to a magnetic field sensor positioned within an electric actuator housing. A spring biases the magnet into a positional range adjacent to the field sensor.

17 Claims, 21 Drawing Sheets

(56) References Cited

U.S. PATENT DOCUMENTS

| | | | | |
|---|---|---|---|---|
| 5,435,516 A * | 7/1995 | Ogasawara | F16F 1/3849 | 248/638 |
| 5,453,649 A * | 9/1995 | Blanchet | H02K 23/66 | 310/71 |
| 5,696,360 A * | 12/1997 | Tiemeyer | H02K 5/24 | 181/207 |
| 6,088,458 A | 7/2000 | Hasegawa et al. | | |
| 6,122,996 A | 9/2000 | Hauser et al. | | |
| 6,152,412 A * | 11/2000 | Basickes | F16L 3/127 | 248/74.1 |
| 6,332,393 B1 | 12/2001 | Trimble | | |
| 6,664,681 B1 * | 12/2003 | Ashe, Jr. | H02K 5/00 | 29/596 |
| 6,676,091 B2 * | 1/2004 | Hauer | F16L 3/1075 | 248/74.3 |
| 6,707,188 B2 | 3/2004 | Torii et al. | | |
| 6,775,976 B1 | 8/2004 | Phanco et al. | | |
| 6,921,994 B2 | 7/2005 | Kawakami et al. | | |
| 7,134,276 B1 | 11/2006 | Langenfeld et al. | | |
| 7,150,438 B2 * | 12/2006 | Schaty | F16L 3/1008 | 248/74.1 |
| 7,495,359 B2 | 2/2009 | Klinke et al. | | |
| 7,546,986 B2 * | 6/2009 | Kim | F16L 3/1008 | 248/62 |
| 8,459,137 B1 * | 6/2013 | McCoy | F16H 61/437 | 74/473.29 |
| 8,616,507 B2 * | 12/2013 | Willey | B62D 65/06 | 248/74.1 |
| 8,777,794 B2 * | 7/2014 | Oishi | H02K 7/1166 | 475/162 |
| 9,114,798 B1 | 8/2015 | Fox et al. | | |
| 9,169,837 B2 * | 10/2015 | Pascual | F01C 21/007 | |
| 9,441,705 B2 * | 9/2016 | Hein | F16M 1/021 | |
| 9,482,369 B2 * | 11/2016 | Sampson | F16L 3/127 | |
| 9,541,156 B2 * | 1/2017 | Blumenthal | E05C 1/06 | |
| 9,683,325 B2 * | 6/2017 | Kim | D06F 39/12 | |
| 9,764,734 B1 | 9/2017 | Brown | | |
| 9,994,161 B2 * | 6/2018 | Mahfoudh | H02K 5/16 | |
| 10,058,031 B1 | 8/2018 | Brown et al. | | |
| 10,414,436 B1 | 9/2019 | Bonny | | |
| 10,576,316 B1 * | 3/2020 | Kulick | F16B 21/14 | |
| 10,871,225 B2 | 12/2020 | Pezzotta et al. | | |
| 10,890,253 B1 | 1/2021 | Probst et al. | | |
| 2002/0117908 A1 * | 8/2002 | Sanchez | H02K 5/24 | 310/89 |
| 2006/0181166 A1 | 8/2006 | Saito et al. | | |
| 2012/0012731 A1 * | 1/2012 | Johnson | F01N 13/1822 | 248/638 |
| 2013/0320184 A1 * | 12/2013 | Rachuy | F04B 53/003 | 248/638 |
| 2014/0169987 A1 | 6/2014 | Du | | |
| 2014/0209781 A1 | 7/2014 | Weber et al. | | |
| 2017/0174181 A1 * | 6/2017 | Guibert | B60S 1/0444 | |
| 2019/0052132 A1 * | 2/2019 | Ranalli | H02K 3/522 | |
| 2019/0353153 A1 * | 11/2019 | Kobayashi | F04B 53/003 | |

\* cited by examiner

VIBRATION DAMPING APPARATUS FOR MOUNTING AN ELECTRIC ACTUATOR ON A HYDRAULIC DRIVE

CROSS-REFERENCE

This application claims the benefit of U.S. Provisional Patent App. No. 63/136,026, filed on Jan. 11, 2021. This prior application is incorporated by reference herein in its entirety.

BACKGROUND OF THE INVENTION

This application relates to a control mechanism for a variable drive apparatus generally, and in particular to an apparatus for mounting an electric actuator on a variable drive apparatus having a rotatable control shaft, the combination intended for use in a vehicle or other mobile power equipment.

SUMMARY OF THE INVENTION

An apparatus for mounting an electric actuator for use with a drive apparatus such as a hydraulic pump, hydraulic transmission or transaxle is disclosed herein. The electric actuator has a rotary design incorporating a magnetic field sensor chip disposed on a circuit board to sense the rotational orientation of a cylindrical diametric magnet positioned on the end of a control shaft of a hydrostatic drive unit. Specifically, the longitudinal axis of the magnet is collinear with the rotational axis of a control shaft of the swash plate of an axial piston variable displacement pump.

A biasing member is used to maintain a functional spacing between the magnet and the magnetic field sensor chip. The mounting apparatus also includes a vibration damping device comprising a clamp that surrounds a housing of the electric motor portion of the electric actuator assembly to isolate and protect the electric motor from shock and vibration. A cushion is used to enhance the vibration damping protection.

The foregoing summary is exemplary of the description only, and a better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
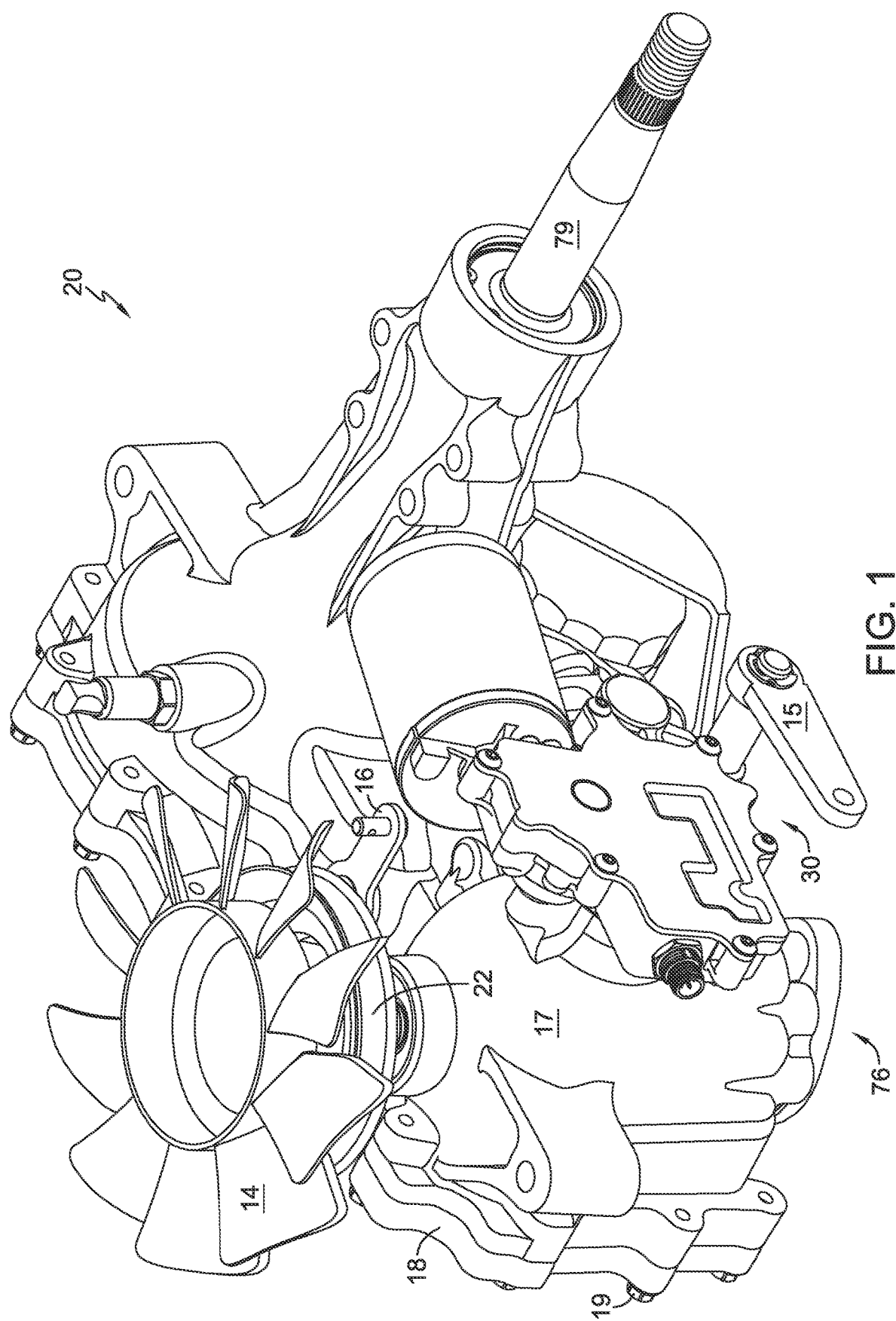
FIG. 1 is a perspective view of an embodiment of an electric actuator applied to a hydrostatic transaxle forming a representative drive assembly.

The description that follows describes, illustrates and exemplifies one or more embodiments of the invention in accordance with its principles. This description is not provided to limit the inventions to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

Additionally, the drawings set forth herein are not necessarily drawn to scale, and in some instances proportions may have been exaggerated to more clearly depict certain features. Also, terms such as "left hand" and "right hand" may be used for convenience to describe orientation of objects as illustrated, but are not to be construed as limiting. It should be noted that in the description and drawings of vehicles disclosed herein, such as vehicle 190 and vehicle 290, like or substantially similar elements may be labeled with the same reference numerals. Or, these elements may be labeled with differing numbers or serial numbers using different prefixes in cases where such labeling facilitates a more clear description or understanding. As stated above, this specification is intended to be taken as a whole and interpreted in accordance with the principles of the invention as taught herein and understood by one of ordinary skill in the art.

Figure 2:
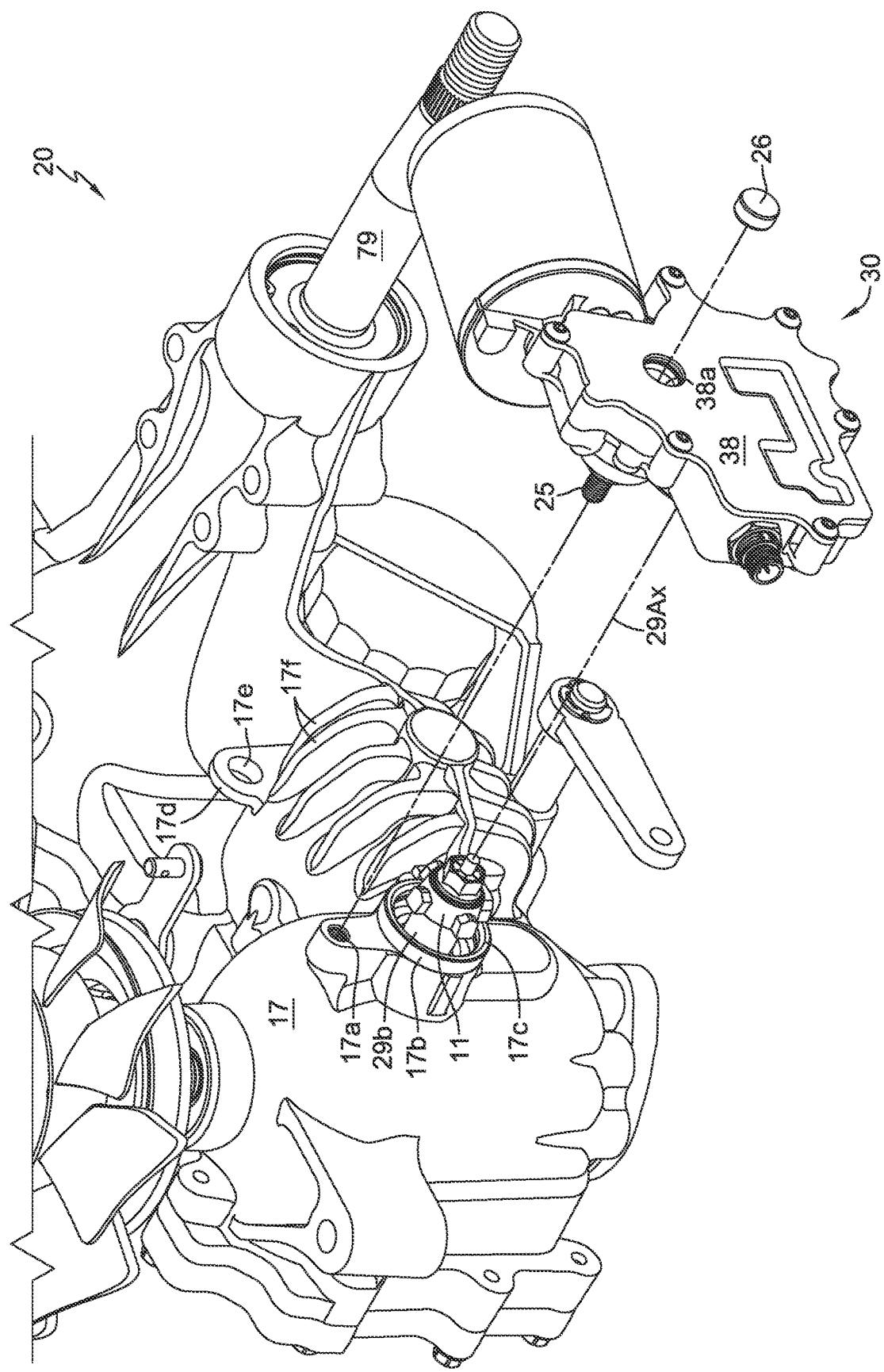
FIG. 2 is a partially exploded view of the assembly shown in FIG. 1.

As discussed herein in detail, FIGS. 1-15 depict an electric actuator assembly, related components and vehicle applications. The disclosure of these figures is also incorporated in commonly-owned U.S. Pat. No. 10,890,253, the terms of which are incorporated herein by reference. FIGS. 1 and 2 depict an electric actuator assembly 30 applied to a representative drive apparatus 20, which is useful in powering a vehicle or other mobile power equipment, and may be referred to herein as a transaxle. Except as described herein, the internal structure and operation of transaxle 20 can be substantially identical to that shown and described in commonly-owned U.S. Pat. No. 7,134,276, the terms of which are incorporated herein by reference in their entirety. Transaxle 20 comprises a main housing 17 and a side housing 18 secured by fasteners 19. FIG. 9 is an interior view showing side housing 18, and in particular, showing the internal structure of transaxle 20, including hydraulic pump 21 rotatably disposed on center section 75 in main sump chamber 69 and controlled by swash plate 29 of swash plate assembly 10. Swash plate assembly 10 is shown most clearly in FIGS. 3 and 4. Hydraulic motor 94 is similarly disposed in main sump chamber 69 and drives motor output shaft 77, which in turn powers reduction gear train 78 to provide motive force to output axle 79. Pump input shaft 74 provides motive force to pump 21 and may also drive an optional charge pump 76. Swash plate 29 is used to vary the output of pump 21. Other typical items include input pulley 22 having a fan 14 mounted therewith, and a bypass arm 16 for placing the hydraulic system of transaxle 20 into a bypass state. A brake arm 15 is provided for actuating an internal brake 23 and an optional charge pump 76 is depicted as being external, and it would be connected to the hydraulic system by known means. The description of the transaxle 20 should be understood to be exemplary only and the features shown therein are not required except as specified in the claims.

FIGS. 1-3 and 5-8 depict different aspects of electric actuator assembly 30, showing it both connected to the transaxle 20 and separated therefrom. Electric actuator assembly 30 is capable of making precise control adjustments to variable drive apparatuses, such as variable displacement pump 21. While variable displacement pump 21 is illustrated as an axial piston pump of the type disclosed in commonly-owned U.S. Pat. No. 6,332,393, it is to be understood that electric actuator assembly 30 may be applied to actuate any drive apparatus having a rotatable control shaft, e.g. hydrostatic transmissions or transaxles of the types illustrated in commonly-owned U.S. Pat. Nos. 6,122,996 and 6,775,976. Electric actuator assembly 30 is similar in some aspects to the electric actuator disclosed in commonly-owned U.S. Pat. No. 9,114,798. All commonly-owned patents cited within this specification are incorporated herein by reference in their entirety. Application of the electric actuator disclosed herein to other types of variable drive apparatuses having rotatable control shafts, such as toroidal, friction and mechanical drives, is also contemplated within the scope of the invention described herein.

Actuator assembly 30, sometimes referred to herein as actuator 30, comprises a motor control module 30a and a drive module 30b. Motor control module 30a is shown in exploded format in FIGS. 6-8, and comprises actuator housing 32 having housing cover 38 secured thereto by means of fastener 36 and mounting boss 32i on actuator housing 32. Motor control module 30a (including actuator housing 32) is secured to gear housing 31 by means of a plurality of fasteners 35 connected to mounting bosses 31i, and alignment pins 32e cooperate with alignment openings 31j to assist in proper alignment and assembly. Alignment pins 32e may be integrally formed, as shown, or may be separate components. Actuator housing 32 could also be referred to as a circuit board housing or electrical housing, as it does not contain all elements of the actuator, as will be described in detail herein.

In the depicted embodiment, electric actuator assembly 30 is attached to main housing 17 by means of a mounting fastener 25 attached to lockdown bore 17a, and pilot 17b is used for proper alignment of gear housing 31 on main housing 17. In another embodiment (not shown), lockdown bore 17a can be used as a standard threaded hole in the housing 17 for mounting a portion of a return to neutral mechanism, so the embodiment disclosed herein does not require a significant reconfiguration of an existing housing design. A pair of centering and anti-rotation tabs 31a is provided on gear housing 31, and located on a horizontal plane through the rotational axis 29Ax of swash plate 29. Anti-rotation tabs 31a ensure an easy slip-fit of actuator assembly 30 onto pilot 17b and prevent binding and possible cross-threading when mounting fastener 25 is tightened to secure actuator assembly 30 to main housing 17. Gasket seal 37 and seal land 17c are provided for proper sealing of the assembled unit.

As can be seen in, e.g., FIGS. 5 and 8, and described in more detail below, fastener 25 serves multiple purposes, including its function as a jack shaft for pinion gear 52. Fastener 25 may also be referred to as a jack shaft or a "shaft/fastener." Shaft/fastener 25 comprises a first end having a threaded portion 25a, and a second end having a worm and pinion gear support portion 25b, along with an integral pinion gear thrust washer 25c which acts as a bearing surface for pinion gear 52. The integral thrust washer 25c also serves as a flange that bears against the gear housing 31 when electric actuator assembly 30 is attached to main housing 17. The support portion 25b extends through and is supported in part by support bore 32a of actuator housing 32. The second end of shaft/fastener 25 also includes an installation driver interface or recess 25d for securing the shaft/fastener 25. By performing multiple functions, shaft/fastener 25 reduces costs and improves ease of assembly. An access hole 38a in cover 38 allows access to shaft/fastener 25 for easy assembly, and this single fastener attachment configuration also enables fast, easy removal of actuator assembly 30 for service. An elastomeric plug 26 can be used to seal the access hole 38a.

Figure 6:
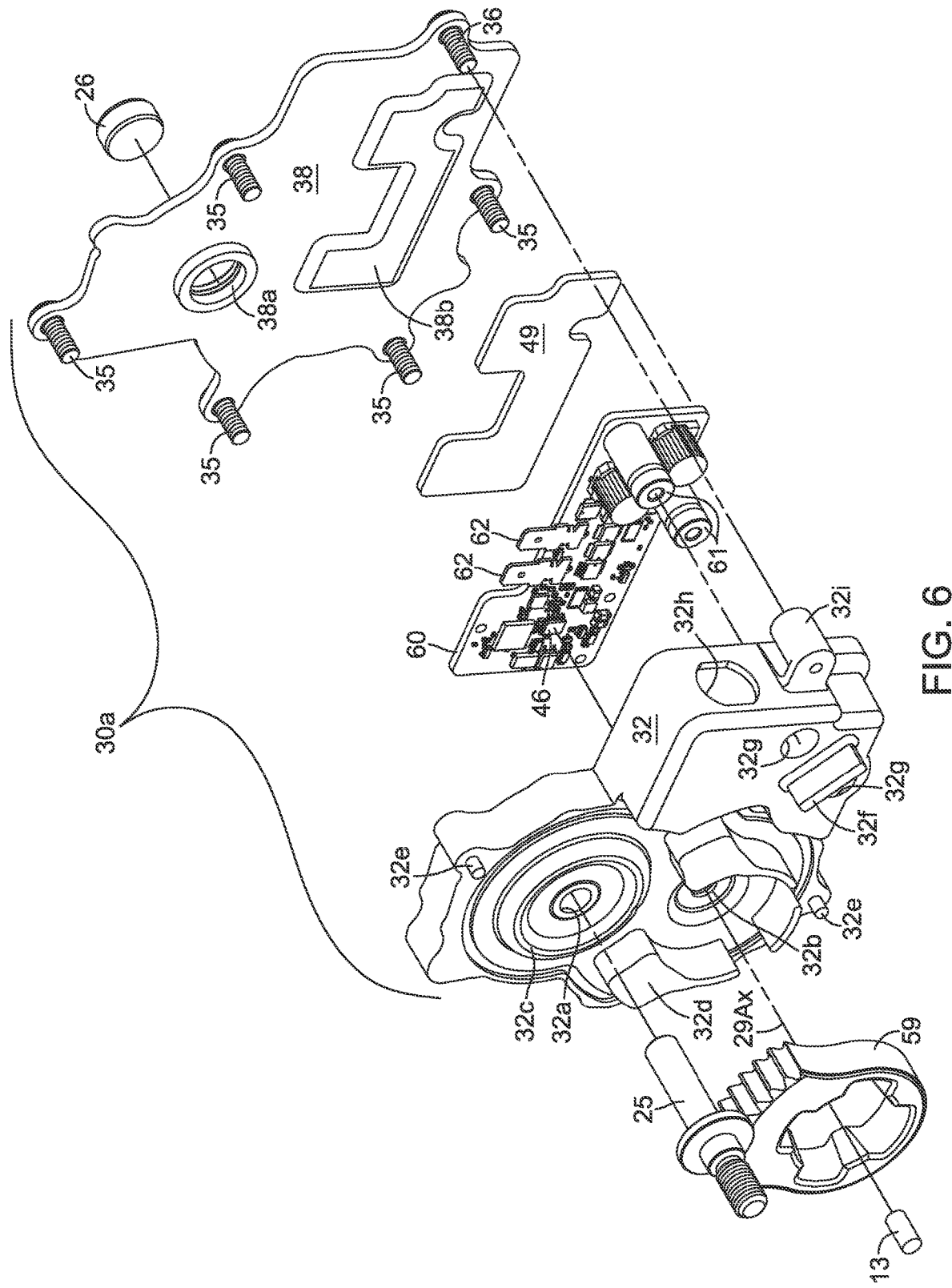
FIG. 6 is an exploded view of the electrical module and additional selected components shown in FIG. 5.
Figure 7:
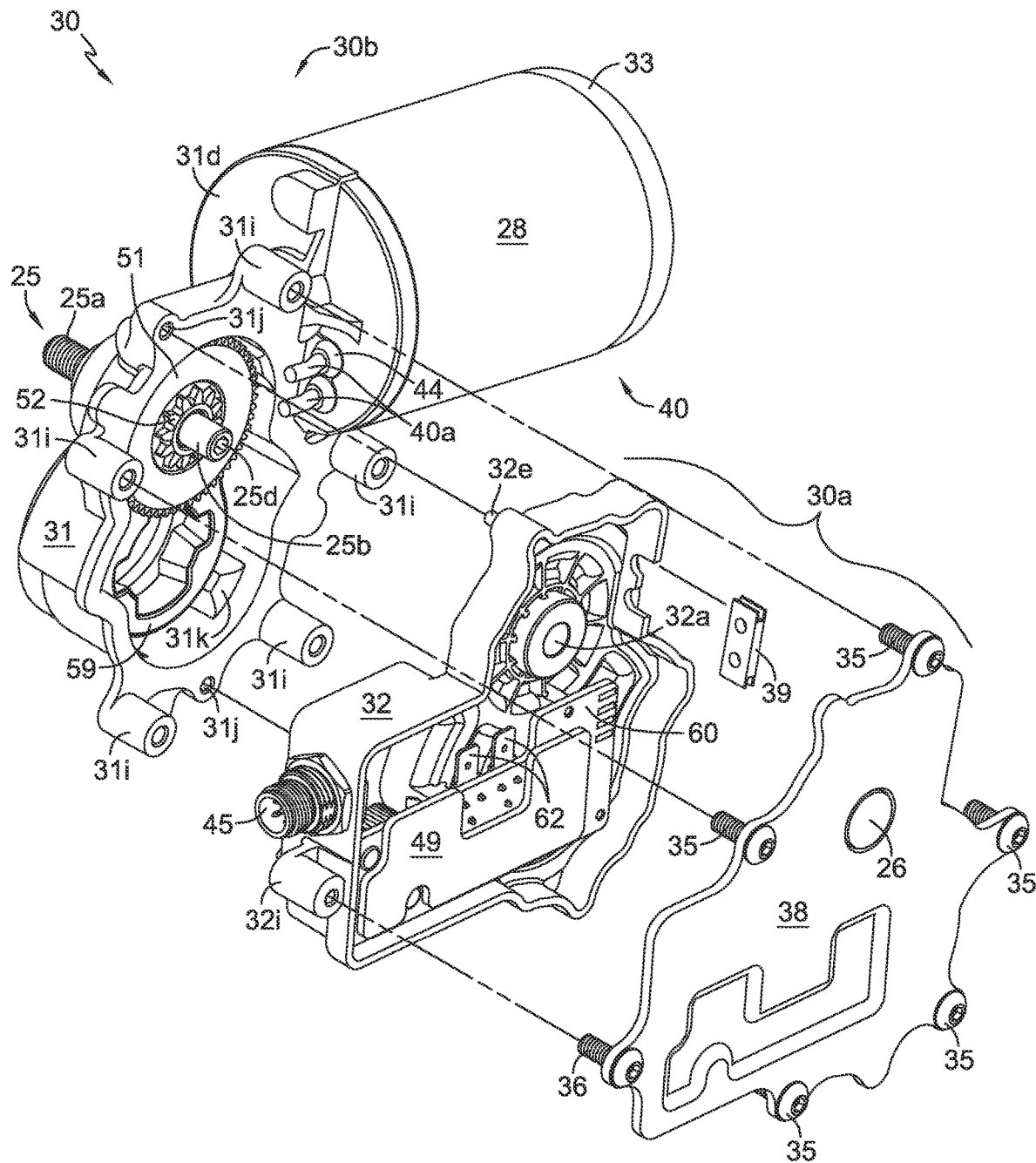
FIG. 7 is a partially exploded view of the drive module and the electrical module of the electric actuator shown in FIG. 2.
Figure 8:
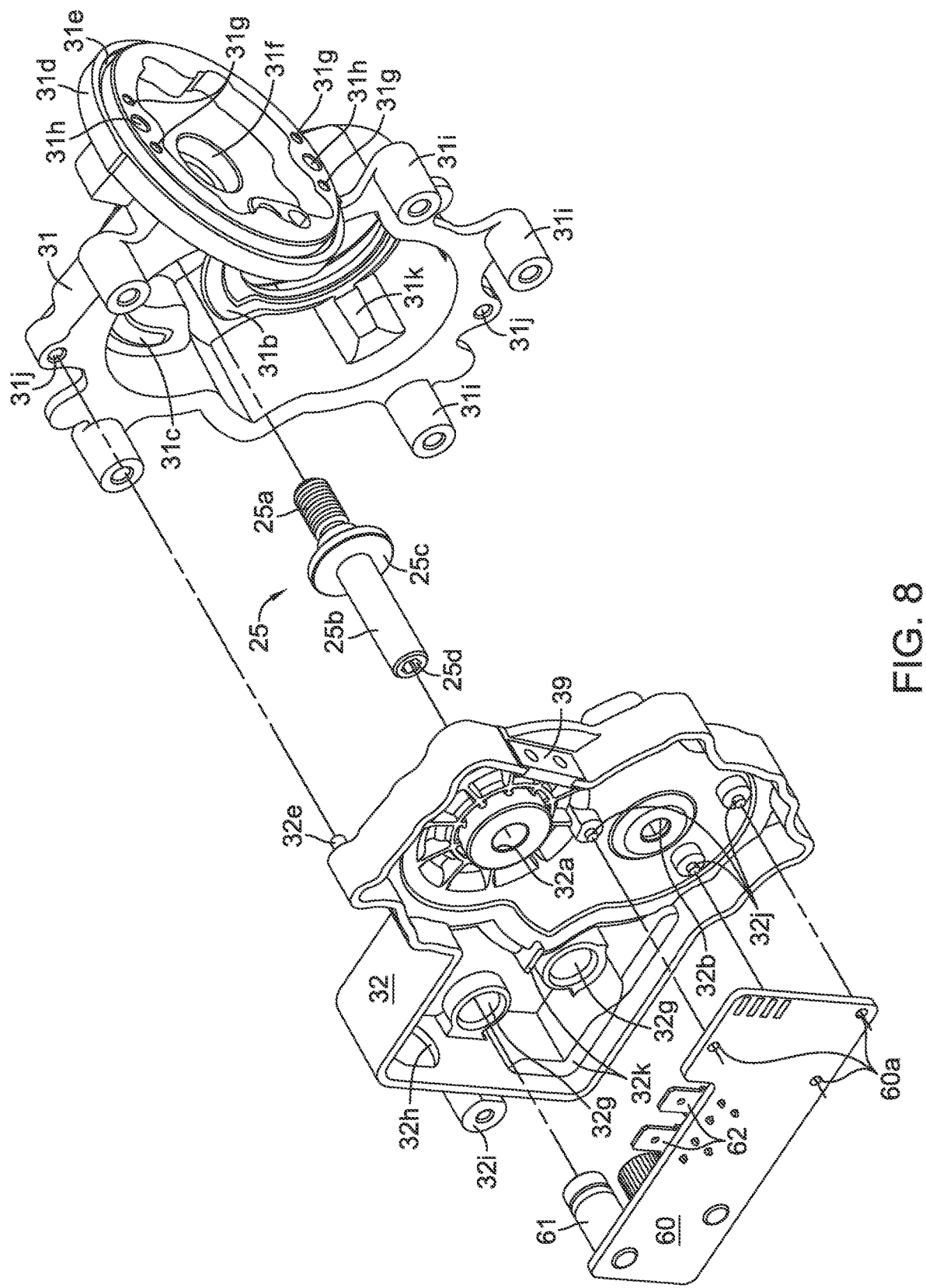
FIG. 8 is an exploded view of the gear housing, jack shaft, electrical housing and circuit board rotated 90 degrees in relation to the view illustrated in FIG. 7.
Figure 9:
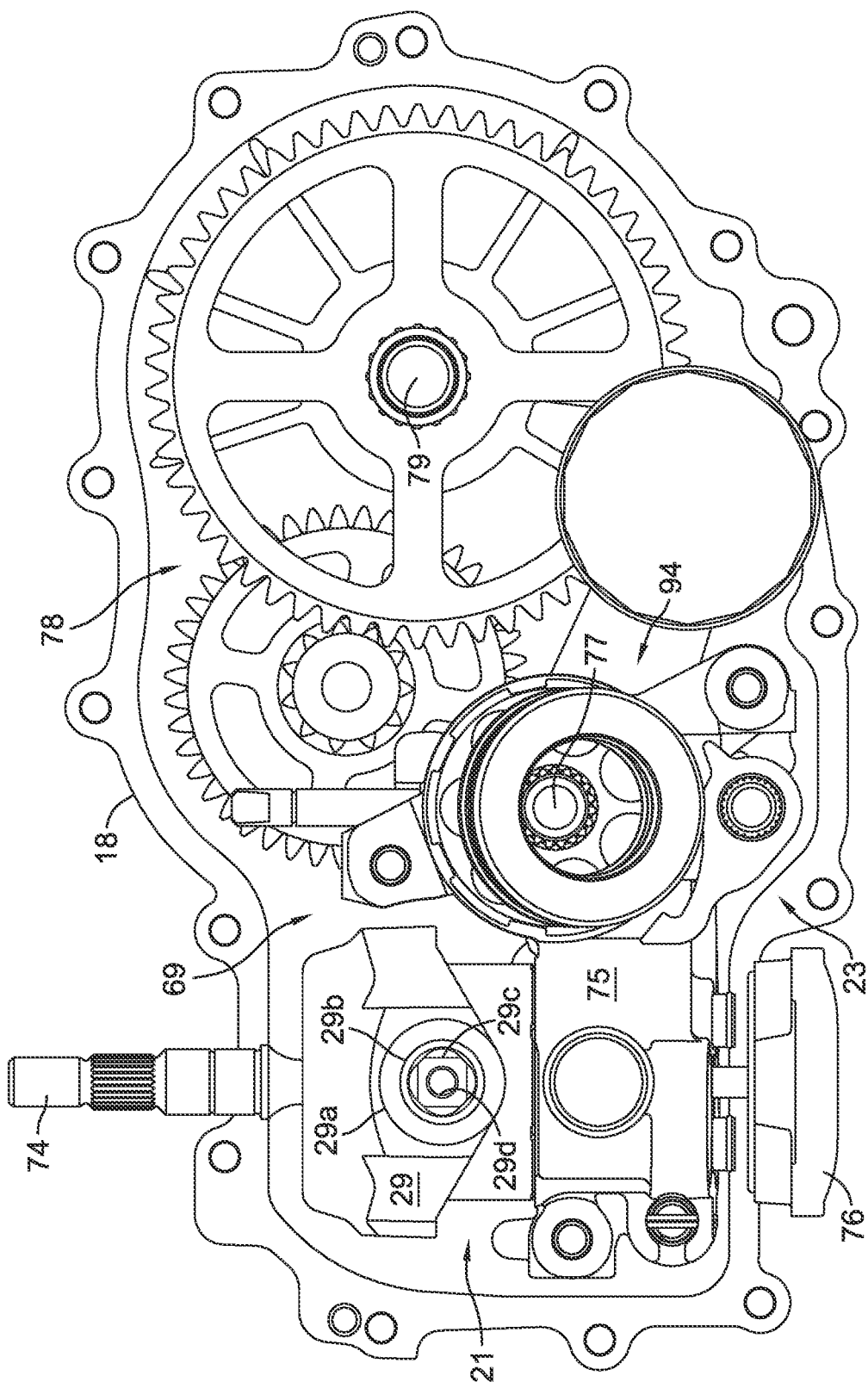
FIG. 9 is an interior elevational view of the transaxle of FIG. 1, from the axle side of the transaxle, with the main housing component removed to show the interior components of the transaxle.

Circuit board 60 is disposed inside actuator housing 32, as shown in e.g., FIGS. 6-8, and comprises a magnetic field sensor chip 46, power terminals 61 for external conductor attachment, and power terminals 62 for internal attachment of electric motor power conductors 40a. A wire protector or routing clip 39 is depicted for the support, sealing and protection of conductors 40a. Power terminals 61 extend through power terminal support openings 32g formed in actuator housing 32 when the unit is assembled and power terminals 61 are sealed in the support openings 32g. An external partition 32f is provided to ensure separation of electrical connections when external electrical conductors are attached to the power terminals 61. Circuit board 60 provides CAN Bus capability to actuator assembly 30 by means of, among other things, electrical connector 45 mounted in opening 32h in actuator housing 32. It will be understood that the specific detailed wiring components of circuit board 60, connector 45 and other components are not depicted in these figures for clarity. One of ordinary skill in the art will understand the appropriate wiring requirements for the embodiment as depicted.

Circuit board support structures 32k are provided in actuator housing 32, and alignment pins 32j mate with openings 60a on circuit board 60 for proper mounting and alignment, particularly alignment of the magnetic field sensor chip 46 with magnet 13 of swash plate assembly 10. A thermal pad 49 is also disposed inside actuator housing 32 between circuit board 60 and cover 38, and a pressure applicator 38b is formed on cover 38 to apply pressure to the preferably putty-like, thermally conductive thermal pad 49.

As noted above, swash plate assembly 10 comprises a swash plate 29, which may be referred to as a trunnion mounted swash plate, and a drive adapter 11 secured to control shaft 29b of swash plate 29 by means of a specialized fastener 12. Swash plate 29 includes a pair of trunnions 29a on opposite sides thereof and rotates about rotational axis 29Ax. A first trunnion 29a is mounted in a known rotatable manner in a support (not shown) in side housing 18. A second trunnion 29a has a control shaft 29b extending therefrom with a mounting interface 29c formed on the end thereof for engaging a mounting interface 11c of adapter 11. Control shaft 29b has a distal end adjacent to the second trunnion 29a and disposed inside main sump chamber 69, and a proximal end disposed outside of main housing 17. Fastener 12 extends through the drive adapter 11 and engages threaded bore 29d. The head of fastener 12 includes bore 12a for receiving and securing a magnet 13, which includes north and south poles 13N, 13S as depicted. After assembly, magnet 13 extends through magnet access opening 32b in actuator housing 32 to place the magnet 13 adjacent to the magnetic field sensor chip 46 on circuit board 60. The location of magnet 13 as a component of swash plate assembly 10 enables accurate measurement of the true swash plate position, as the longitudinal axis of magnet 13 is collinear with the rotational axis 29Ax of swash plate 29, and is oriented perpendicular to the magnetic field sensor chip 46.

As a further benefit, the mounting of drive adapter 11 directly on swash plate 29 allows the transaxle 20 to be built in a first location and the actuator 30 to be assembled in a second, different location, and then easily connected together. A true neutral position or neutral dead band for actuator 30 may be calibrated using a method similar to that taught in U.S. Pat. No. 9,114,798, which is incorporated herein by reference in its entirety.

Figure 5:
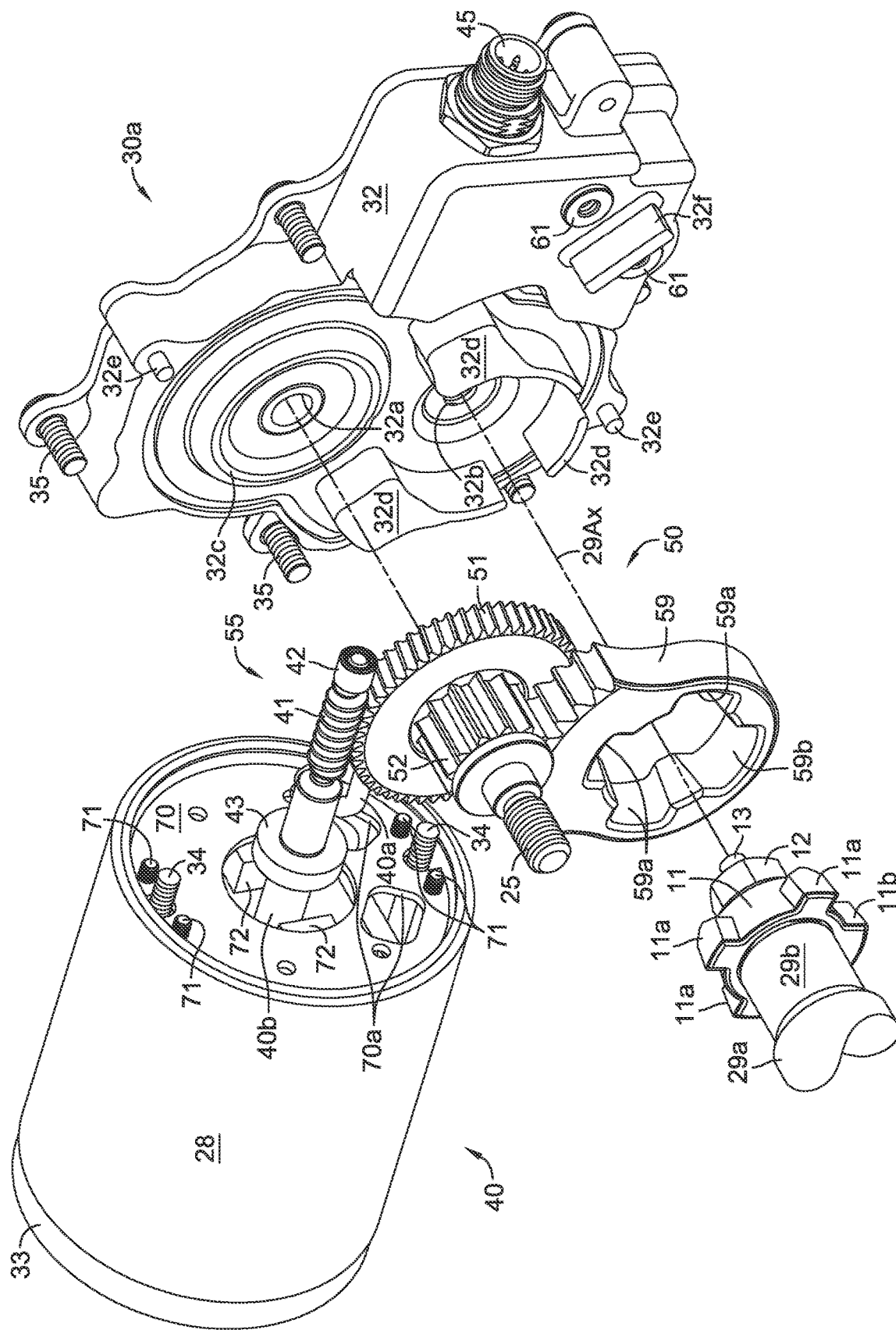
FIG. 5 is a partially exploded view of the engagement end of the swash plate assembly and the electric actuator shown in FIG. 3, with the gear housing removed for clarity.

Various components of drive module 30b are shown in FIGS. 5 and 9. Electric motor 40 has a motor housing 28 and a motor shaft 40b supported by a set of bearings 43, one of which is shown, one of which is mounted in end cap 33, and bushing 42. A bearing support 31f is shown in gear housing 31 and bushing 42 is also supported in gear housing 31. Motor 40 uses worm drive 55 for providing output to swash plate assembly 10 and more specifically, integral worm 41 is formed on motor shaft 40b and is engaged to and drives worm gear 51. Worm gear running surfaces 31c and 32c are provided on gear housing 31 and actuator housing 32, respectively. Gear train 50 is mounted in gear housing 31 and further comprises pinion gear 52 driven by worm gear 51. Sector gear 59 is engaged to and driven by pinion gear 52, and thus controls the rotational position of swash plate 29. Sector gear running surfaces 31b and 32d are provided on gear housing 31 and actuator housing 32, respectively. As noted before, pinion gear 52 is supported on shaft/fastener 25, which also acts to secure actuator assembly 30 to housing 17.

As shown in, e.g., FIG. 5, drive adapter 11 also includes a plurality of projections 11a for engaging engagement slots 59a of sector gear 59, as well as a clocked alignment projection 11b for engaging alignment slot 59b of sector gear 59, for ensuring proper alignment of the components during assembly. Projections 11a, 11b are ramp structures that cooperate with corresponding ramped engagement slots 59a, 59b to move sector gear 59 from an approximate initial assembled position into its exact operating position when actuator assembly 30 is attached to transaxle 20. Gear housing 31 includes assembly supports 31k to locate sector gear 59 in its approximate initial assembled position, but there is no contact with supports 31k after sector gear 59 is moved into its exact operating position.

Motor 40 is preferably a brushed DC motor, as shown. In addition to motor housing 28, motor 40 comprises end cap 33, power conductors 40a, grommets 44, and a pair of brushes 72 attached to a brush card 70. A benefit of this design is that brushes 72 are located at the front of motor 40, i.e., adjacent the output end of motor shaft 40b as opposed to being at the rear of motor 40. Motor 40 is secured to integral motor end cap 31d of gear housing 31 by means of fasteners 34 which are installed through (and secure) end cap 33 and are attached to threaded openings 31h formed in end cap 31d. Fasteners 71 are used to secure brush card 70 to threaded openings 31g prior to mounting the bulk of motor 40 on end cap 31d. An O-ring groove 31e is provided for sealing the unit. Wire routing openings 70a are formed in brush card 70 for routing power conductors 40a to grommets 44 (and then through wire protector 39 to power terminals 62). This location of wire routing openings 70a reduces the size and complexity of the wiring needed, since the wiring exits the motor housing 28 and directly enters actuator housing 32. Furthermore, the use of end cap 31d of gear housing 31 as a portion of the motor housing, as opposed to having a separate end cap, reduces size and material costs, and improves tolerances during assembly by machining at least a portion of the support structure for worm drive 55 and jack shaft 25 within a single gear housing 31 and thereby ensuring proper gear alignment and gear mesh.

Figure 10:
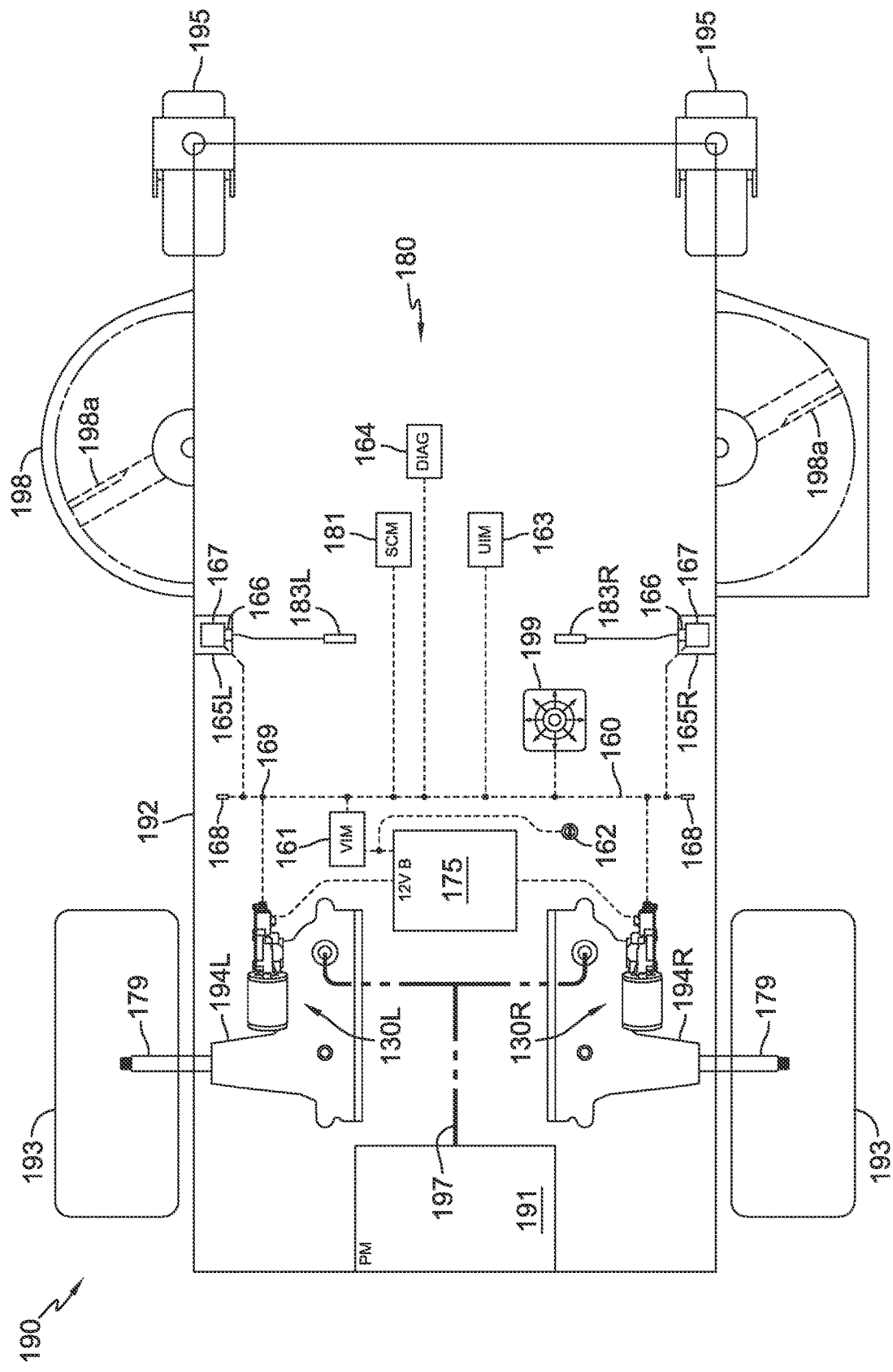
FIG. 10 is a schematic view of a zero turn vehicle incorporating a pair of representative drive assemblies, each including an electric actuator of the present disclosure.

FIG. 10 depicts a zero turn vehicle 190 incorporating an embodiment of a vehicle control system 180. Vehicle 190 includes a frame 192 on which is mounted a prime mover, such as internal combustion engine 191, that drives a pair of hydrostatic transaxles 194L, 194R by means of a conventional power transfer apparatus, such as belt and pulley system 197. Internal combustion engine 191 may further drive (by means of belt and pulley system 197) an optional mowing deck 198 having mowing blade(s) 198a. Mowing deck 198 may be selectively engaged by operation of a manual or electric clutch-brake-pulley mechanism (not shown). Transaxle 194L is essentially the same as transaxle 20 described previously herein and transaxle 194R is essentially a mirror image of transaxle 20, 194L.

Each of the hydrostatic transaxles 194L, 194R includes an output axle 179 engaged to a drive wheel 193 to provide propulsion and steering as directed by the vehicle operator via control levers 183L, 183R engaged to respective speed control mechanisms 165L, 165R or via an optional joystick 199. For purposes of this disclosure, the respective speed control mechanisms 165L, 165R may include any or all of the speed control mechanisms, features and functionality described in commonly-owned U.S. Pat. No. 10,414,436, which is incorporated herein by reference in its entirety. Vehicle 190 also has a pair of non-driven, non-steered caster wheels 195 that freely pivot and track in response to the steering impetus provided by the drive wheels 193. Each hydrostatic transaxle 194L, 194R has an electric actuator 130L, 130R mounted thereon to control the output thereof. Electric actuator 130L is essentially the same as electric actuator 30 described previously herein and electric actuator 130R is essentially a mirror image of electric actuator 30, 130L. Electric actuators 130L, 130R receive power from a 12V battery 175 that is charged by an alternator or similar power generating device (not shown). Each electric actuator 130L, 130R is connected to a Vehicle Integration Module (VIM) 161 by way of a CAN Bus (communication network) 160. CAN Bus 160 is powered through the VIM 161, which receives power from battery 175 when key switch 162 is turned on, and directs power and serial communication through CAN Bus 160. The aforementioned pair of speed control mechanisms 165L, 165R (each comprising an optional neutral switch 166 and a speed and direction controller 167) are also in communication with the VIM 161 via CAN Bus 160. Control signals are generated and transmitted via CAN Bus 160 in response to operator manipulation of the left and right-side control levers 183L, 183R engaged to the pair of speed control mechanisms 165L, 165R. A CAN Bus termination 168 (comprising a resistor) is connected to each end of the CAN Bus 160 network wiring harness to ensure communication speed and signal integrity on CAN Bus 160. This type of termination is necessary and typical in a CAN Bus communication system.

Vehicle control system 180 comprises a number of intelligent, electronic modules functioning as a single system and coordinating their activities via CAN Bus 160. These modules include (but are not limited to) the aforementioned Vehicle Integration Module (VIM) 161; Lap Bar Sensor Modules (LBSM) 165L, 165R (also referred to herein as speed control mechanisms 165L, 165R); Joystick Control Module (JSM) 199 (also referred to herein as joystick 199); High Speed Actuators with integrated Electronic Drive Modules (HSA-EDM) 130L, 130R (also referred to herein as electric actuators 130L, 130R); CAN Bus Termination Modules (CTRM) 168 (also referred to herein as CAN Bus terminations 168); User Interface Module (UIM) 163; Diagnostic Module and graphical user interface or GUI (DIAG) 164; and Stability Control Module (SCM) 181. Additional information regarding such modules may be found in commonly owned U.S. Pat. No. 10,058,031, the terms of which are incorporated herein by reference in their entirety.

Operator Commands (in the form of absolute position data) are generated by the LBSM 165L, 165R and/or JSM 199 modules and communicated to the CAN Bus 160 network.

The HSA-EDM 130L, 130R and VIM 161 may be configured to monitor these commands and, if valid, respond by driving the actuator(s) to the requested position(s). Invalid commands are responded to with appropriate error handling or failsafe routines.

The VIM 161 monitors vehicle status and overrides operator position commands if necessary for proper control of vehicle 190. The VIM 161 may provide status information to the operator of vehicle 190 for a variety of system functions including speed, operating temperature and battery status when the vehicle contains a UIM 163 and this feature is enabled.

The HSA-EDM 130L, 130R system will continuously compare the actual actuator positions to the operator-requested positions and drive the actuator motors to the commanded positions using a motion profile based on tunable parameters stored in the non-volatile memory of each HSA-EDM 130L, 130R.

The UIM 163 displays vehicle status information messages generated by the VIM 161 and transmitted via the CAN Bus 160 to the vehicle operator.

The SCM 181 can process signals generated by an Inertial Measurement Unit (IMU) to modify operator drive and steering command signals sent to the electric actuators 130L, 130R. The IMU component may comprise a gyroscope, accelerometer and magnetometer. SCM 181 can be configured to provide stability control in the form of straight line tracking, wheel slip and traction control, hillside stability and rollover protection. The SCM 181 may include some or all of the features and functionality described in commonly owned U.S. Pat. No. 9,764,734, the terms of which are incorporated herein by reference in its entirety. For example, the SCM 181 may be an Inertial Measurement Unit (IMU) module configured to include a 9-axis or 11-axis IMU incorporating an accelerometer, gyroscope and magnetometer. The IMU module may also include a microprocessor, temperature sensor, CAN interface and other elements.

Figure 11:
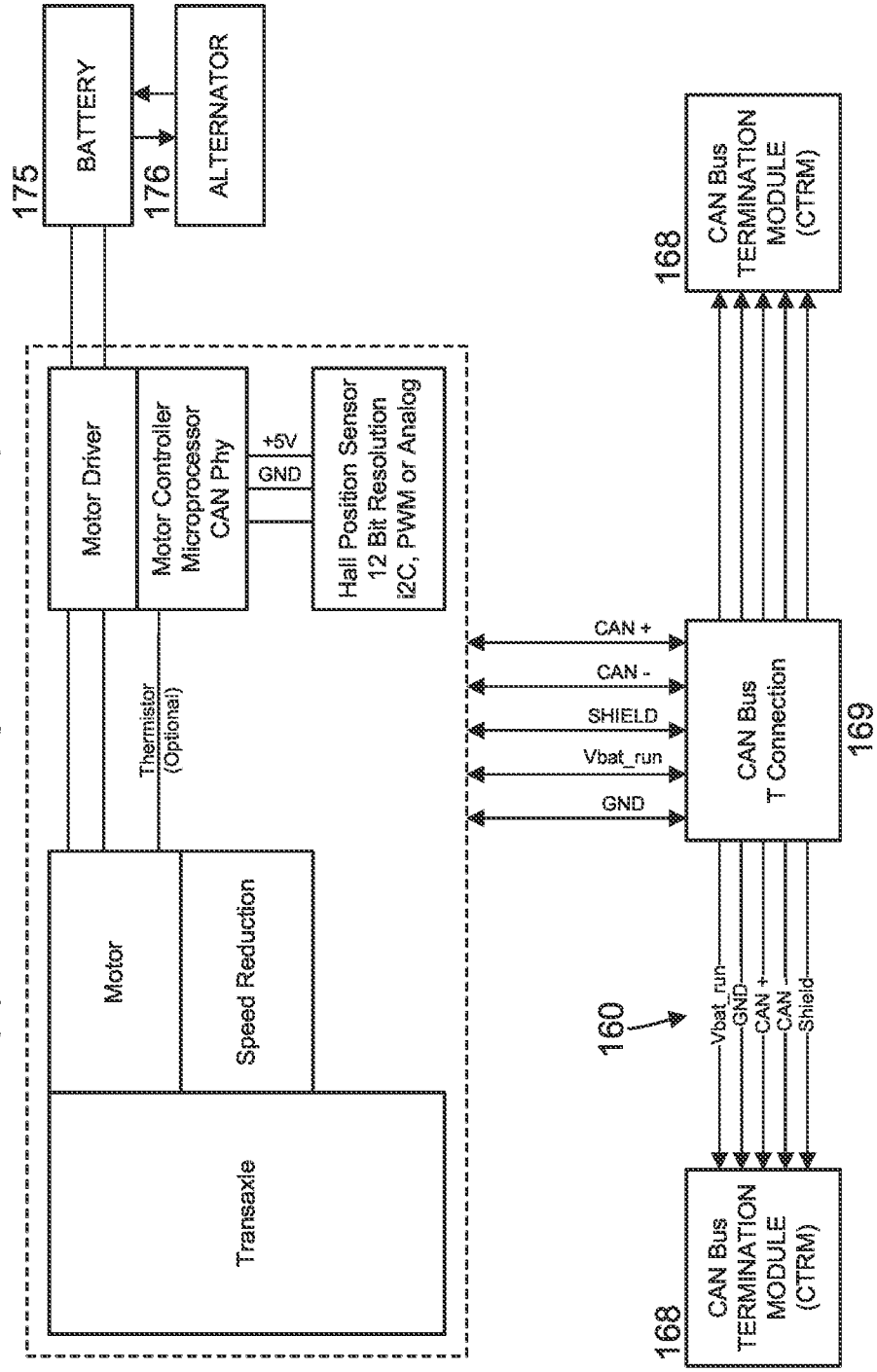
FIG. 11 is a schematic view of a representative drive assembly and additional selected components, including a CAN Bus, of the vehicle of FIG. 10.

FIG. 11 illustrates certain component relationships and the basic control configuration of the drive assemblies. The relationship between the drive assemblies and electrical power supply components (battery 175 and alternator 176) is also indicated, as is the connection between the drive assemblies and the CAN Bus 160. It should be noted that alternator 176 may be any type of suitable electrical power generator.

Figure 12:
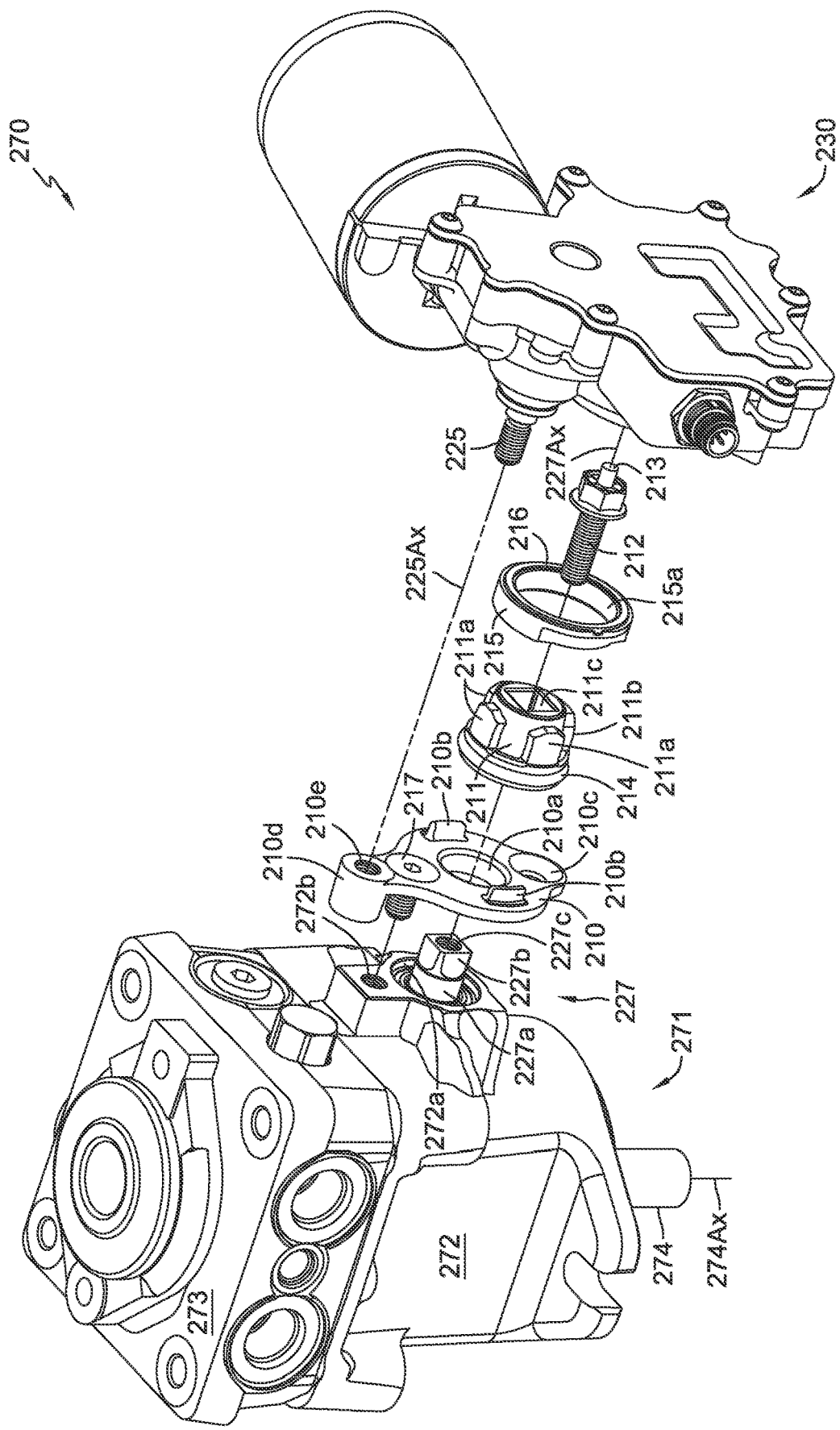
FIG. 12 is a partially exploded perspective view depicting an electric actuator of the present disclosure and adaptive components for mounting the electric actuator on a hydraulic pump to form an electric actuator controlled pump assembly.

FIG. 12 depicts an electric actuator 230 of the present disclosure and adaptive components for mounting the electric actuator 230 on a hydraulic pump 271 to form a pump assembly 270 that is controlled via electric actuator 230. Electric actuator 230 is essentially the same as electric actuator 30 described previously herein. The basic construction of hydraulic pump 271 is known in the art, and is disclosed in commonly-owned U.S. Pat. No. 6,332,393, the terms of which are incorporated herein by reference in their entirety. Hydraulic pump 271 comprises an input shaft 274 and a main housing 272 having an end cap 273 mounted thereon. End cap 273 can be rotated 180 degrees about the rotational axis 274Ax of input shaft 274 to enable configuration of the left hand and right hand pump assemblies 270L, 270R shown in FIG. 13.

Figure 3:
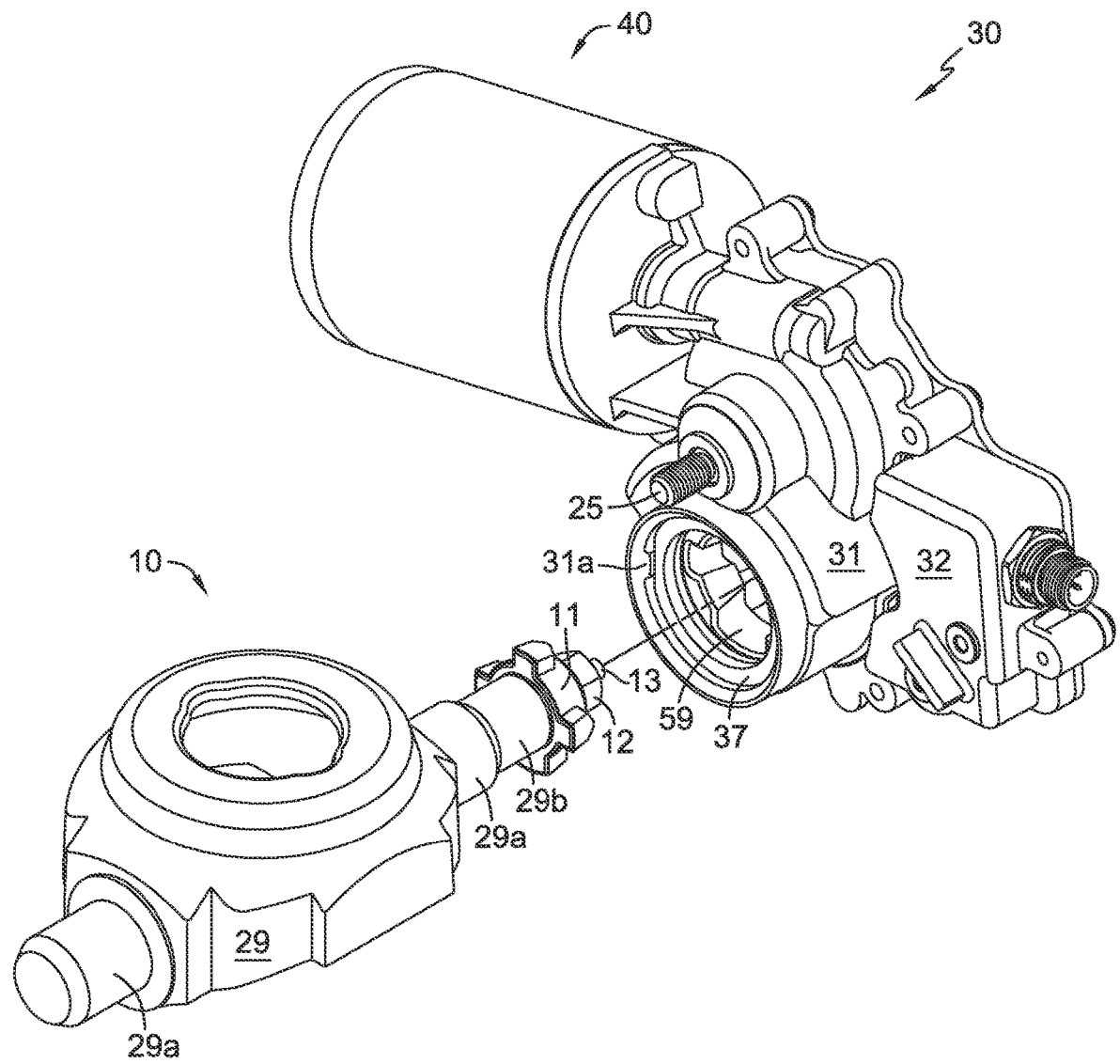
FIG. 3 is a partially exploded view of a swash plate assembly and the electric actuator of the drive assembly shown in FIG. 1.
Figure 4:
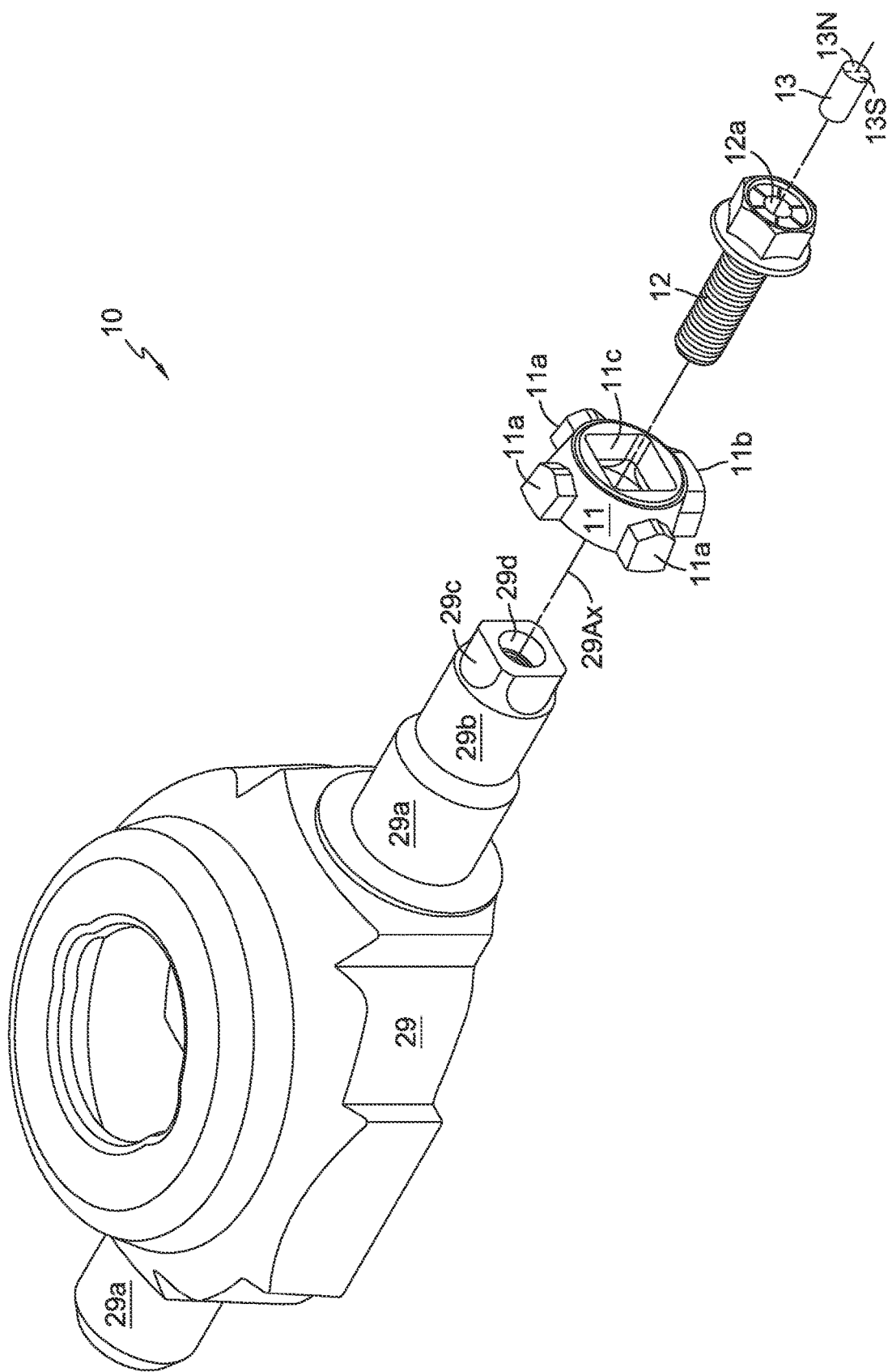
FIG. 4 is an exploded view of the swash plate assembly shown in FIG. 3.

When hydraulic pump 271 is assembled, the drive interface between electric actuator 230 and hydraulic pump 271 is similar to that shown in FIG. 3. Trunnion arm 227 comprises a control shaft 227a having an adapter mounting interface 227b formed thereon to receive a drive adapter 211. Drive adapter 211 includes a plurality of projections 211a and a clocked alignment projection 211b that serve the same function as the previously described projections 11a, 11b of drive adapter 11. Drive adapter 211 also has a mounting interface 211c similar to mounting interface 11c. Drive adapter 211 differs from drive adapter 11 due to an O-ring 214 installed thereon. O-ring 214 rotates against a sealing face 215a formed on a sealing adapter 215. O-ring 214 cooperates with a seal 216 installed on the sealing adapter 215 to seal electric actuator 230 when electric actuator 230 is attached to a mounting adapter 210. Similar to fastener 12 and magnet 13 described previously herein, a specialized fastener 212 with a cylindrical diametric magnet 213 secured thereto engages a threaded bore 227c formed in the control shaft 227a to attach the drive adapter 211 following attachment of the mounting adapter 210 to main housing 272. Mounting adapter 210 is interposed between main housing 272 and adapter 211 and is secured to main housing 272 by means of a single fastener 217 that is installed through one of two countersunk openings 210c to engage a threaded bore 272b formed in main housing 272. Although just one countersunk opening 210c is required to mount the mounting adapter 210, two countersunk openings 210c can be provided to accommodate different pump models and/or to allow 180 degree rotation of electric actuator 230 about axis 227Ax in order to provide an optional mounting orientation in relation to hydraulic pump 271 (or other similar hydraulic pump configuration). Mounting adapter 210 comprises a clearance opening 210a that allows the control shaft 227a to protrude therethrough to engage adapter 211 and has four anti-rotation projections or tabs 210b (two of which are formed on each of its inboard and outboard faces) to engage pilot opening 272a and a similar opening in electric actuator 230. The two projections or tabs 210b formed on the outboard face of mounting adapter 210 are shown in FIG. 12. These two tabs 210b may be similar in form or may differ compared to the two projections or tabs 210b formed on the inboard face of mounting adapter 210, but they serve the same basic function of preventing rotation of a component or assembly that is secured using a single fastener. Referring again to FIG. 3, gasket seal 37 of electric actuator 30 is deleted from the "similar opening in electric actuator 230" and replaced by the sealing adapter 215 and seal 216. The two outboard tabs 210b interface with anti-rotation tabs in electric actuator 230 that are equivalent to the anti-rotation tabs 31a shown in FIG. 3 and overlap the sealing adapter 215 to aid in positioning sealing adapter 215 while preventing rotation of electric actuator 230 about the axis 225Ax of fastener 225. Fastener 225 engages threaded bore 210e formed in boss 210d to attach electric actuator 230 to mounting adapter 210.

Figure 13:
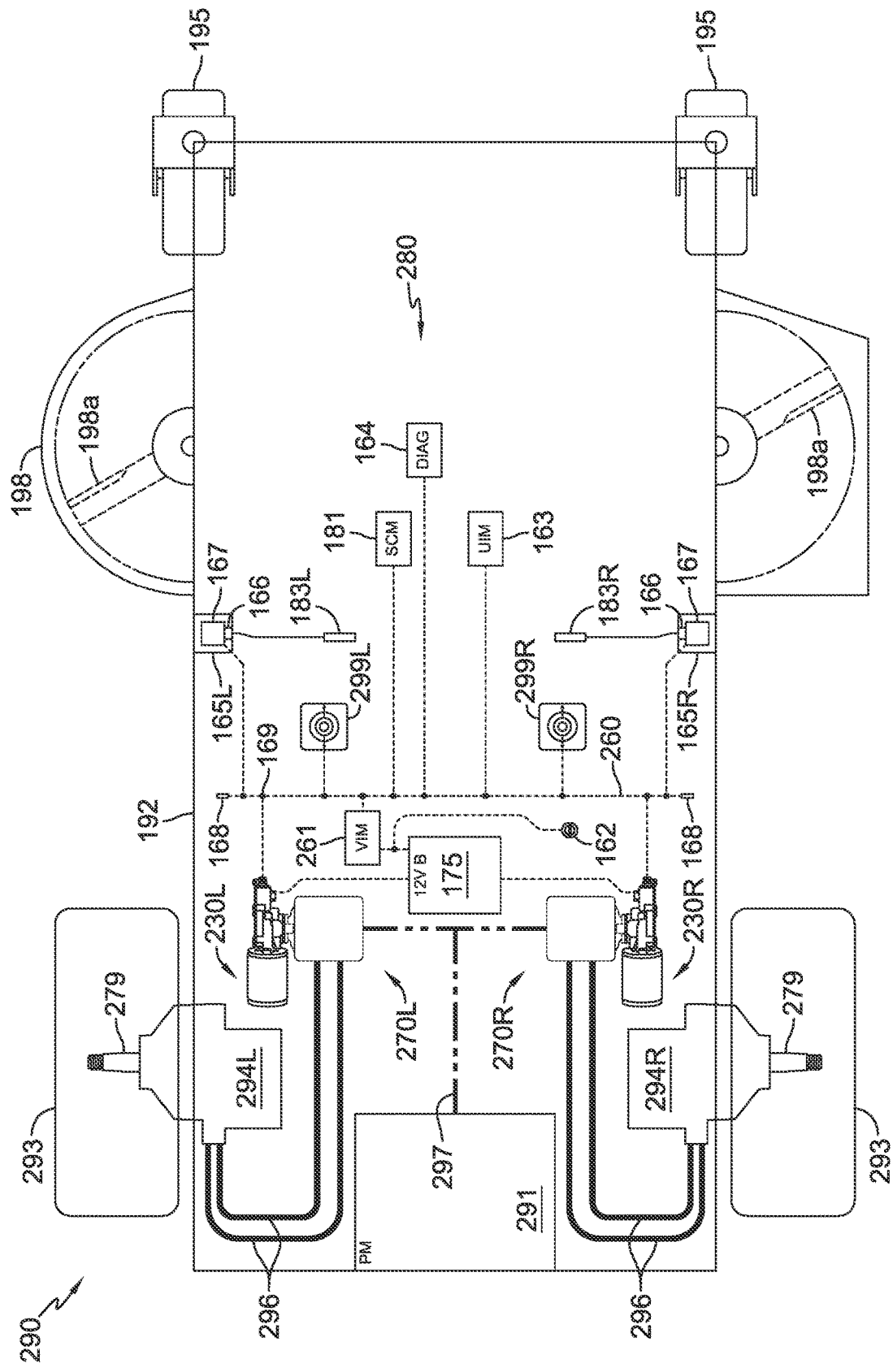
FIG. 13 is a schematic view of a zero turn vehicle incorporating a pair of the pump assemblies of FIG. 12.

FIG. 13 depicts a zero turn vehicle 290 that is similar to vehicle 190 in many respects, including use of a vehicle control system 280 that is substantially the same as the previously described vehicle control system 180. Vehicle 290 includes a prime mover, such as internal combustion engine 291, that drives a pair of pump assemblies 270L, 270R by means of a conventional power transfer apparatus, such as belt and pulley system 297. Each pump assembly 270L, 270R is functionally the same as the previously described pump assembly 270, and pump assembly 270R is essentially a mirror image of pump assembly 270L. The output of pump assemblies 270L, 270R is controlled by electric actuators 230L, 230R, respectively. Each electric actuator 230L, 230R is functionally the same as the previously described electric actuator 230, and electric actuator 230R is essentially a mirror image of electric actuator 230L. Electric actuators 230L, 230R are connected to a VIM 261 by way of a CAN Bus 260. The VIM 261 and the CAN Bus 260 are very similar to the previously described VIM 161 and CAN Bus 160, though there may be some relatively minor differences in firmware, software, and number of connections to CAN Bus 260.

Hydraulic lines 296 connect the pump assemblies 270L, 270R to hydraulic wheel motors 294L, 295R, respectively. (Only the basic hydraulic fluid supply lines are shown schematically since similar pump and wheel motor arrangements are well known in the art. This drive arrangement may also include a hydraulic fluid reservoir and associated hydraulic lines, for example.) Each of the hydraulic wheel motors 294L, 295R includes an output axle 279 engaged to a drive wheel 293 to provide propulsion and steering as directed by the vehicle operator via control levers 183L, 183R engaged to respective speed control mechanisms 165L, 165R or via optional joysticks 299L, 299R, each comprising a Joystick Control Module (JSM), or via a single joystick as described previously herein. Joysticks 299L, 299R may be configured with a limited range of motion (such as forward and reverse movement only) so that they function in a manner similar to control levers 183L, 183R and are each biased to return to a neutral position.

Figure 14:
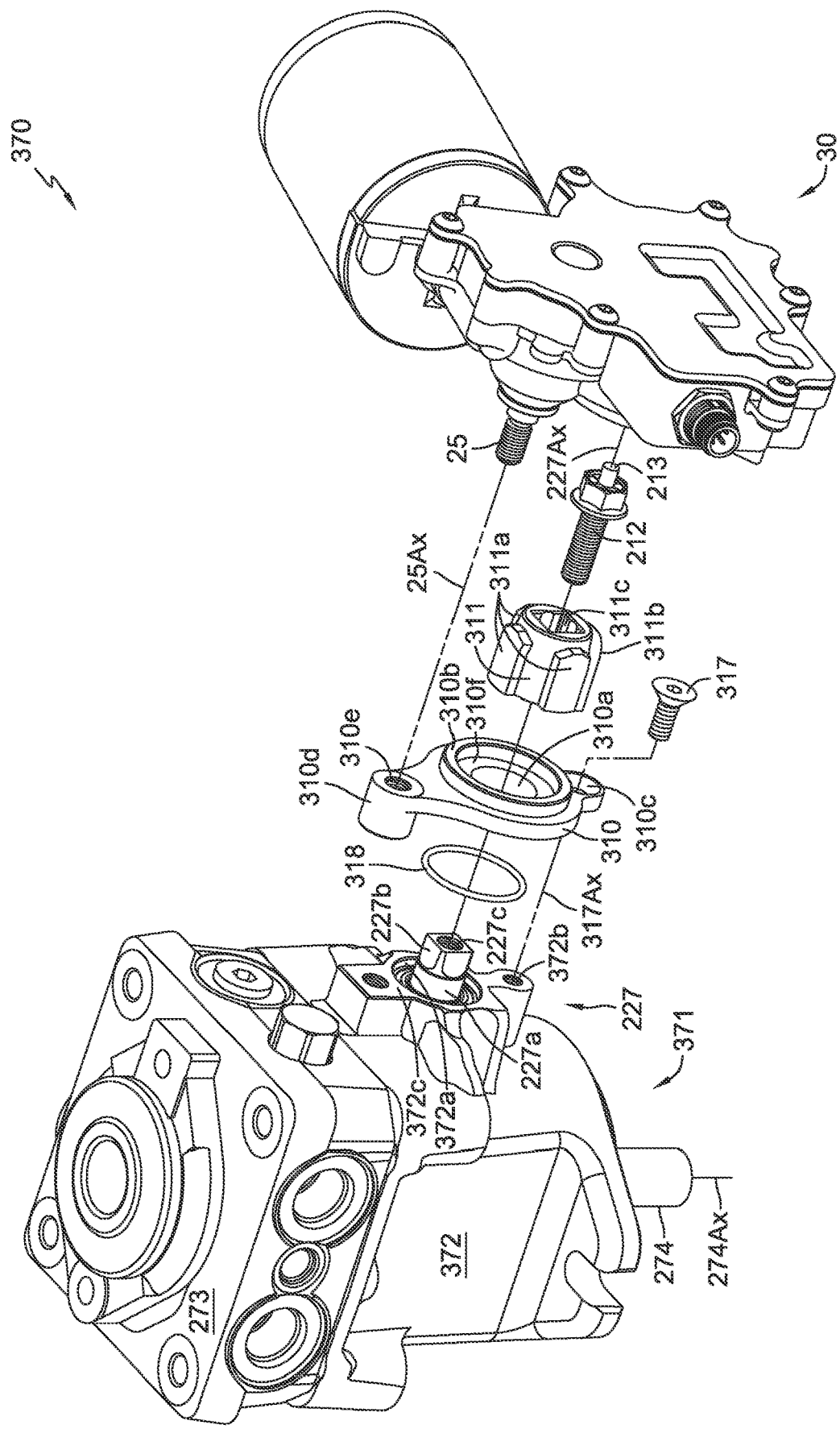
FIG. 14 is a partially exploded perspective view depicting an electric actuator of the present disclosure and alternative adaptive components for mounting the electric actuator on a hydraulic pump to form an electric actuator controlled pump assembly.
Figure 15:
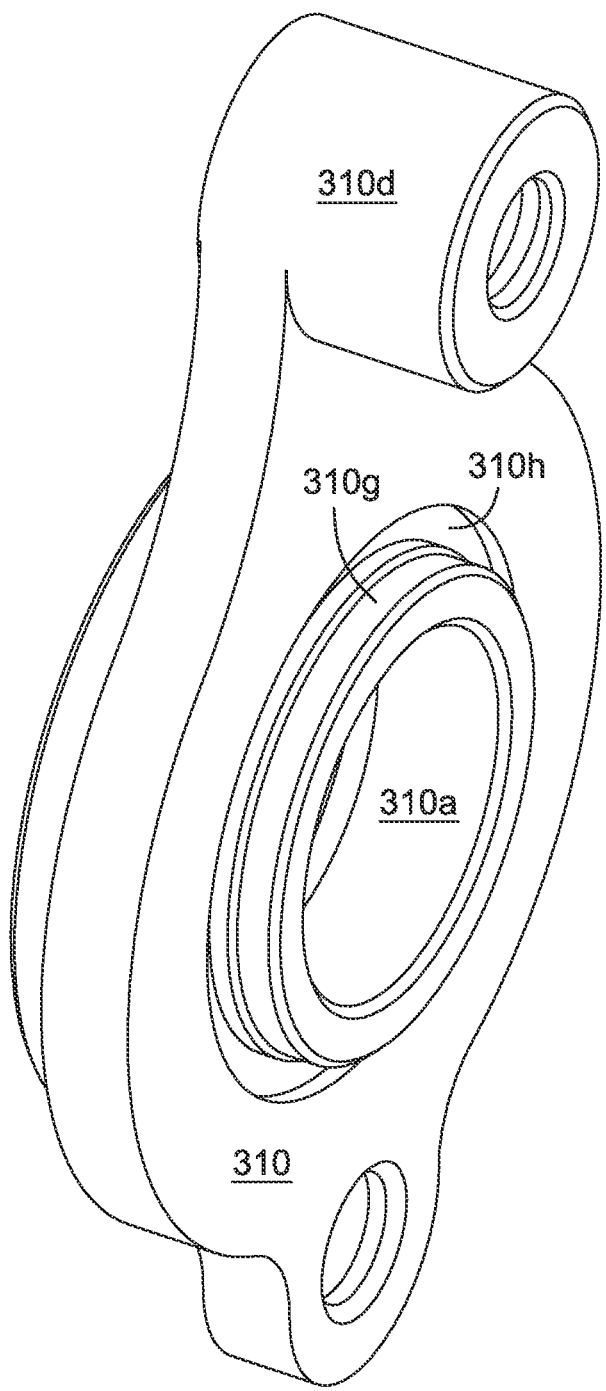
FIG. 15 is a perspective view of a mounting adapter shown in FIG. 14, rotated 180 degrees to show its opposite side.

FIGS. 14 and 15 depict an electric actuator 30 described previously herein and alternative adaptive components for mounting the electric actuator 30 on a hydraulic pump 371 to form a pump assembly 370 that includes control by electric actuator 30. The hydraulic pump 371 may be the same as hydraulic pump 271 with the exception of the adapter mounting interface as will be described below.

In pump assembly 370, the adapter mounting interface 227b of trunnion arm 227 receives a drive adapter 311 with a mounting adapter 310 disposed between the pump main housing 372 and the drive adapter 311. Mounting adapter 310 includes a stop surface 310f to limit axial motion of drive adapter 311 toward main housing 372. Drive adapter 311 includes a plurality of projections 311a and a clocked alignment projection 311b that serve the same function as the previously described projections 11a, 11b of drive adapter 11. Drive adapter 311 also has a mounting interface 311c similar to mounting interface 11c. Similar to pump assembly 270, a specialized fastener 212 with a cylindrical diametric magnet 213 secured thereto engages a threaded bore 227c formed in the control shaft 227a to attach the drive adapter 311 following attachment of the mounting adapter 310 to main housing 372. Mounting adapter 310 is secured to main housing 372 by means of a single fastener 317 that is installed through a countersunk opening 310c to engage a threaded bore 372b formed in main housing 372. Mounting adapter 310 comprises a clearance opening 310a that allows the control shaft 227a to protrude therethrough to engage adapter 311 and has a pilot projection 310g formed concentrically about clearance opening 310a to engage pilot opening 372a. This engagement prevents rotation of adapter 310 about the longitudinal axis 317Ax of fastener 317. An O-ring 318 is positioned in an O-ring groove 310h formed concentrically about the pilot projection 310g, as shown in FIG. 15, and O-ring 318 seals the adapter 310 against a flat seal land 372c machined about the pilot opening 372a. A seal pressure ring 310b formed on the opposite side of the mounting adapter 310 presses against the gasket seal 37 shown in FIG. 3 to seal electric actuator 30 when electric actuator 30 is attached to the mounting adapter 310. The seal pressure ring 310b also interfaces with the gear housing 31 to prevent rotation of electric actuator 30 about fastener axis 25Ax. The longitudinal axis of magnet 213 is collinear with the rotational axis 227Ax of trunnion arm 227, and is oriented perpendicular to the magnetic field sensor chip 46. Fastener 25 engages threaded bore 310e formed in boss 310d to attach electric actuator 30 to the mounting adapter 310.

Figure 16:
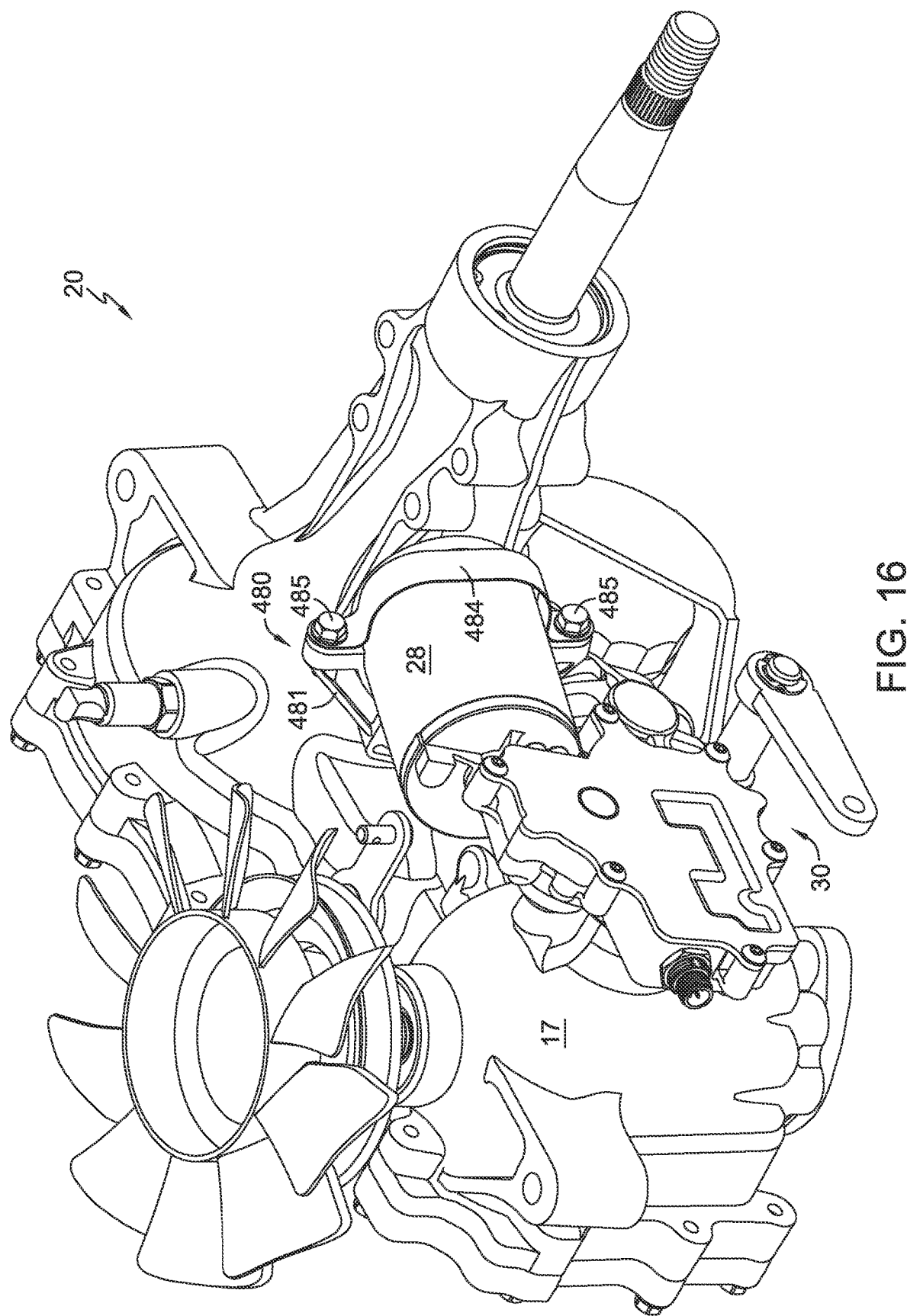
FIG. 16 is a perspective view of a vibration damping assembly applied to the electric actuator and hydrostatic transaxle of FIG. 1.
Figure 17:
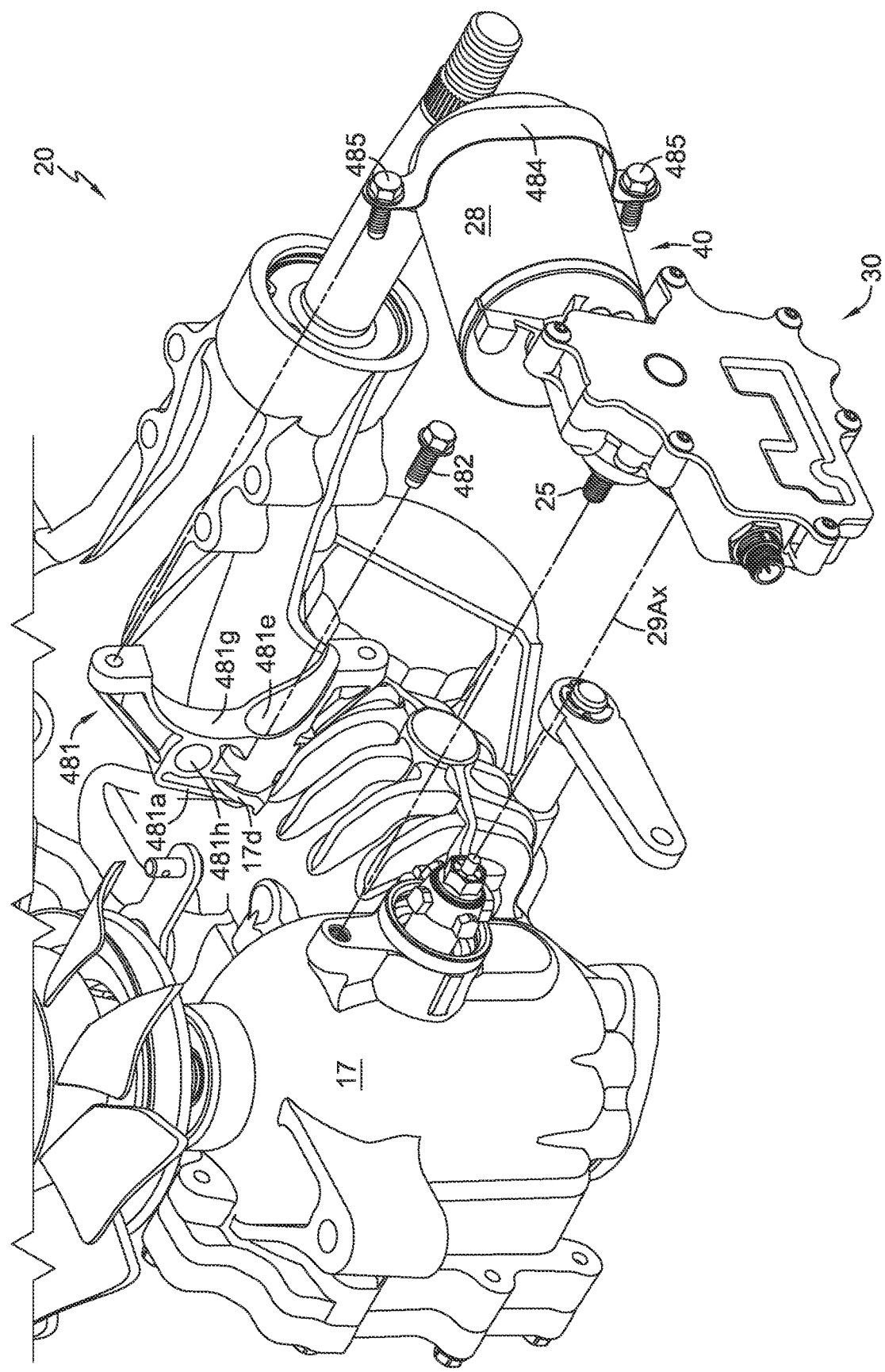
FIG. 17 is a partially exploded perspective view of the vibration damping assembly, electric actuator and hydrostatic transaxle of FIG. 16.
Figure 18:
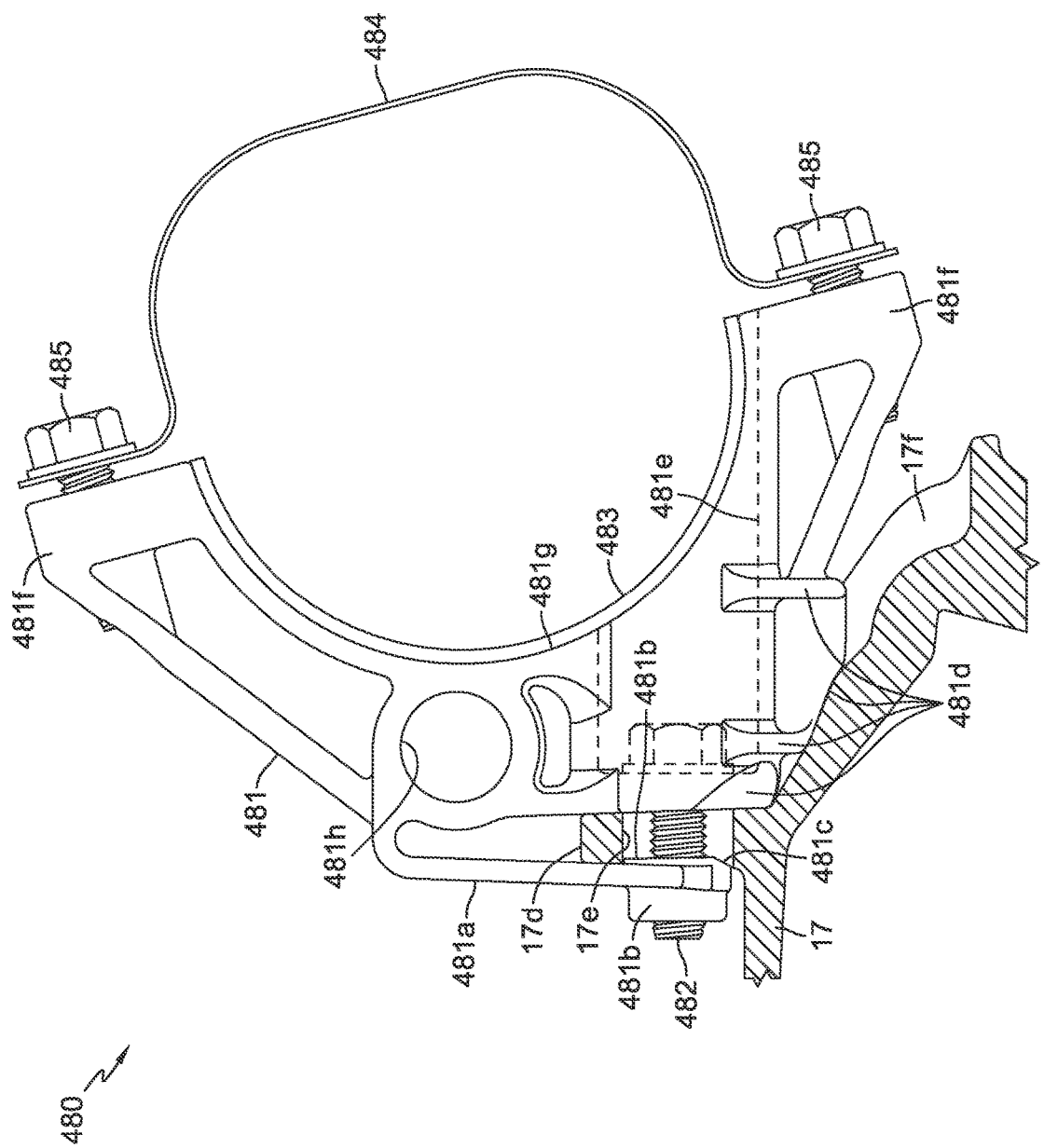
FIG. 18 is a side view of the vibration damping assembly mounted to the main housing of the hydrostatic transaxle of FIG. 16, with the main housing shown partially sectioned and the electric actuator removed for clarity.

FIGS. 16-18 depict an optional vibration damping assembly 480 applied to the electric motor 40 of electric actuator 30 and attached to a lifting lug 17*d* formed on the main housing 17 of drive apparatus 20. In some vehicle applications, shock and vibration forces may be transferred through a vehicle frame such as vehicle frame 192, causing erratic or fluctuating signals from magnetic field sensor chip 46. Vibration damper assembly 480, comprising bracket 481, cushion 483 and strap 484, may be added to the drive apparatus 20 and electric motor 40 to alleviate this condition.

As shown in FIG. 18, bracket 481 includes a clip arm 481*a* with a boss 481*b* formed thereon and with a ramp 481*c* formed on the distal end thereof. As bracket 481 is pushed downward during installation, ramp 481*c* slides over lug 17*d*, causing clip arm 481*a* to deflect. When bracket 481 is pushed farther downward, a portion of the mounting boss 481*b* engages opening 17*e* formed in lifting lug 17*d* to clip bracket 481 into its mounted position. Additionally, various location and anti-rotation elements 481*d*, formed on bracket 481, interface with the contour of main housing 17 and with two housing ribs 17*f* to properly position and retain bracket 481. These location and anti-rotation elements 481*d* cooperate with the engaged mounting boss 481*b* such that only a single fastener 482 is needed to secure bracket 481 in this retained and properly aligned position. Fastener 482 is seated in fastener recess 481*e* and extends through opening 17*e* to engage boss 481*b*. A cushion 483 is applied to a cushion mounting surface 481*g* of bracket 481. Electric actuator 30 is installed as described previously herein, but with the cushioned bracket 481 cradling the motor housing 28 of electric motor 40. Finally, a strap 484 is attached to arms 481*f* with fasteners 485. Strap 484 captures and applies pressure to motor housing 28 to press it firmly against cushion 483 to dampen vibration and provide cushion against shock. A lift opening 481*h* is provided in bracket 481 to serve the purpose of the lifting lug 17*d* that is appropriated to secure the bracket 481.

Figure 19:
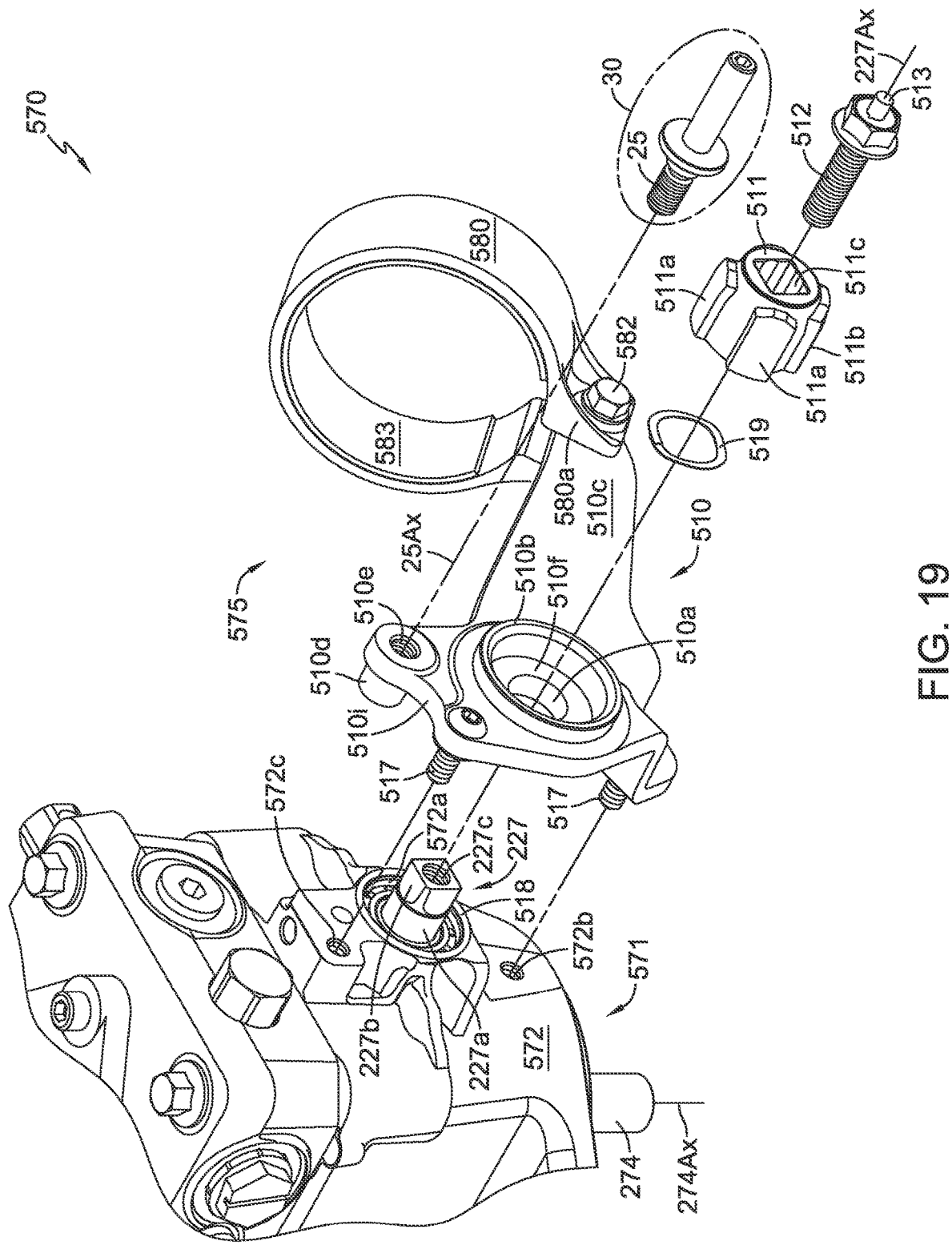
FIG. 19 is a partially exploded perspective view of a vibration damping apparatus for mounting an electric actuator of the present disclosure on a hydraulic pump.
Figure 20:
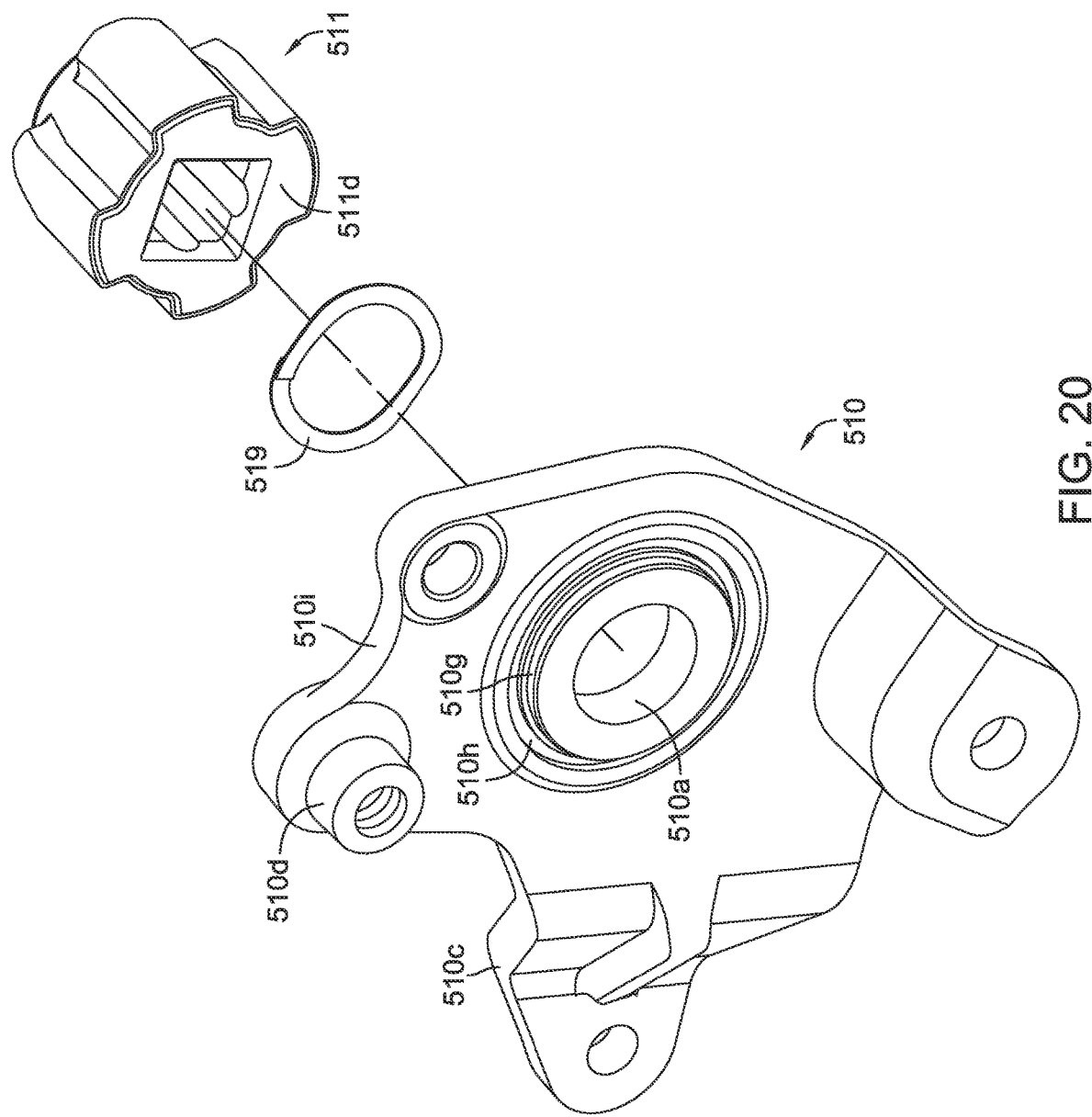
FIG. 20 is an exploded perspective view of selected components of the vibration damping apparatus of FIG. 19.
Figure 21:
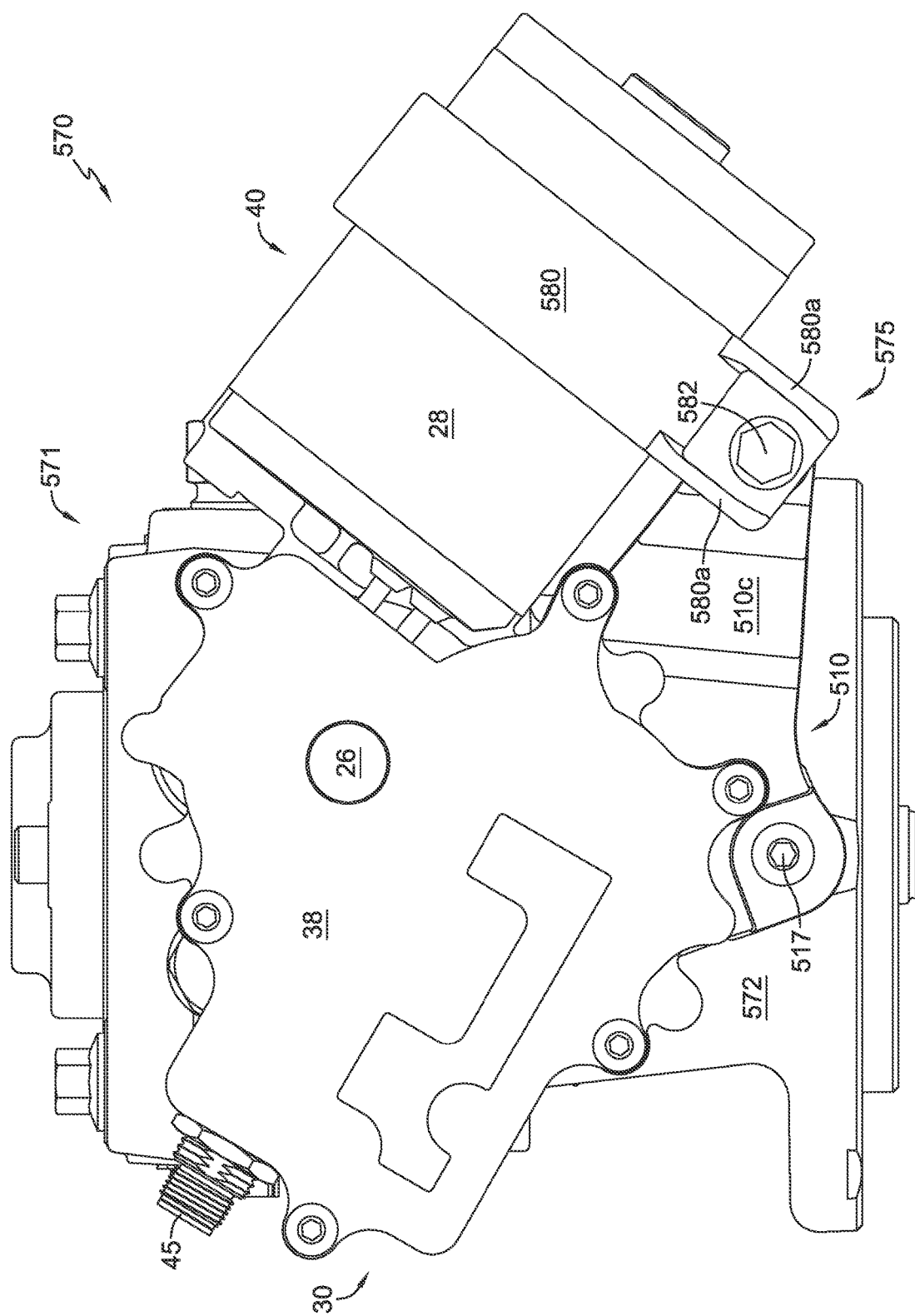
FIG. 21 is a front elevational view of an electric actuator mounted on a hydraulic pump by means of the vibration damping apparatus of FIG. 19.

FIGS. 19-21 depict a vibration damping apparatus 575 (also referred to as a mounting assembly) for mounting the electric actuator 30 (including electric motor 40) on a hydraulic pump 571 to form a pump assembly 570. Electric actuator 30 incorporates a magnetic field sensor chip 46 that interacts with a magnet 513. Magnet 513 must remain within a specified axial position range (as measured along rotational axis 227Ax) adjacent to the magnetic field sensor chip 46 and must also be protected from excessive vibration to achieve good functional results. During operation, excessive vibration of electric actuator 30 and/or movement of the components to which magnet 513 is connected can prevent an accurate or stable reading of the location of magnet 513 when used in connection with a hydraulic pump such as pump 571 depicted herein. The embodiment depicted in FIGS. 19-21 incorporates both a biasing member to bias magnet 513 to a preferred position, and a damping apparatus 575 to protect and stabilize electric motor 40 and electric actuator 30.

Because electric actuator 30 and electric motor 40 have been described above in detail, certain components of electric actuator 30 and electric motor 40 are not described below in detail. Additionally, the hydraulic pump 571 is similar to the hydraulic pumps 271 and 371 described above in detail, with the exception of an adapter mounting interface that is described below. The basic construction of hydraulic pump 571 is disclosed in commonly-owned U.S. Pat. No. 6,332,393, the terms of which are incorporated herein by reference in their entirety. It will also be understood that vibration damping apparatus 575 could be used on other drive assemblies such as, by way of example only, drive apparatus 20 discussed herein.

As shown in FIG. 19, vibration damping apparatus 575 includes a mounting adapter 510, a vibration damping clamp 580, a fastener 582, and a cushion 583. Mounting adapter 510 includes a base plate 510*i* and a clamp support arm 510*c* extending therefrom. In the illustrated example, base plate 510*i* and clamp support arm 510*c* are integrally formed together. Mounting adapter 510 is coupled to main pump housing 572. It will be understood that actuator 30 is depicted schematically in FIG. 19, in order to more clearly depict the other features. Reference is made to the earlier disclosure for details thereon. Fastener 25 is shown to locate the actuator 30.

A robust vibration damping clamp 580 is coupled to a distal end of clamp support arm 510*c* via fastener 582. Clamp 580 is preferably composed of cast aluminum and incorporates gussets 580*a* to increase the strength and prevent flexure thereof. Clamp 580 with gussets 580*a* prevents high amplitude vibration or "whipsawing" of the cantilevered electric motor 40 that can cause "dithering" or "hunting" by the electric actuator. Excessive vibration can cause undesirable relative motion between the magnet 513 and the magnetic field sensor chip 46 which can result in dithering or hunting for the exact position to which the actuator has been commanded to drive. This dithering or hunting can cause spikes in amperage that can overheat and damage electrical components and bearings of the electric motor 40. As shown in FIG. 21, vibration damping clamp 580 extends circumferentially about the electric motor housing 28 and substantially encompasses housing 28 to secure electric motor 40 of electric actuator 30 to the clamp support arm 510*c*. It will be understood that a reference to a clamp encompassing a housing will include the clamp encompassing at least a portion of the housing as depicted, for example, with regard to clamp 580 and housing 28 in FIG. 21. Returning to FIG. 19, vibration damping clamp 580 includes opposing ends, each of which is coupled to the distal end of the clamp support arm 510*c* of mounting adapter 510 via fastener 582. An inner surface of vibration damping clamp 580 extends between the opposing ends of vibration damping clamp 580, and a cushion 583 extends along the inner surface of clamp 580. Cushion 583 is positioned along the inner surface of vibration damping clamp 580 to contact the electric motor housing 28 of electric actuator 30. That is, cushion 583 is interposed and compressed between the clamp 580 and electric motor housing 28 to further dampen and reduce the amplitude of vibration and provide cushion against shock. During assembly, cushion 583 may be first mounted on housing 28 and optionally secured thereto, with clamp 580 then being installed over and compressing cushion 583. Alternatively, cushion 583 could be secured to the inner surface of clamp 580 prior to attaching clamp 580 to mounting adaptor 510. In the illustrated example, cushion 583 extends along a length of the inner surface of vibration damping clamp 580 such that cushion 583 is in contact with at least half the circumference of the electric motor housing 28. Cushion 583 is preferably composed of a durable, firm, closed-cell foam such as Rogers Poron® 4701-60-25062-04.

In pump assembly 570, an adapter mounting interface 227*b* of trunnion arm 227 receives a drive adapter 511 with base plate 510*i* of mounting adapter 510 disposed between the main housing 572 and the drive adapter 511. Base plate 510*i* of mounting adapter 510 defines a clearance opening 510*a* that allows a control shaft 227*a* of trunnion arm 227 to protrude therethrough in order to enable the adapter mounting interface 227b to extend toward electric actuator 30 and engage adapter 511. As shown in FIG. 19, a first side of base plate 510i of mounting adapter 510 defines a stop surface 510f that extends concentrically about clearance opening 510a to limit axial motion of drive adapter 511 toward main housing 572. Drive adapter 511 includes a plurality of projections 511a and a clocked alignment projection 511b that serve the same function as the previously described projections 11a, 11b of drive adapter 11. Drive adapter 511 also has a mounting interface 511c similar to mounting interface 11c. Similar to pump assembly 370, a specialized fastener 512 with a cylindrical diametric magnet 513 secured thereto engages a threaded bore 227c formed in the control shaft 227a to attach the drive adapter 511 following attachment of the mounting adapter 510 to main housing 572. Specialized fastener 512 engages the drive adapter 511 and is received by the threaded bore 227c of the trunnion arm 227 to couple the drive adapter 511 to the trunnion arm 227. Mounting adapter 510 is secured to main housing 572 by means of two fasteners 517 that engage threaded bores 572b and 572c formed in main housing 572.

As shown in FIG. 20, mounting adapter 510 includes a pilot projection 510g extending from a second side of base plate 510i concentrically about clearance opening 510a. Pilot projection 510g protrudes from base plate 510i to engage a pilot opening 572a of main housing 572 that extends concentrically about trunnion arm 227. An O-ring 518 is positioned in an O-ring groove 510h that is defined by base plate 510i and extends concentrically about the pilot projection 510g. O-ring 518, shown in position against the main housing 572, seals the adapter 510 against a flat seal land (similar to seal land 372c) machined on main housing 572 about the pilot opening 572a.

Returning to FIG. 19, a seal pressure ring 510b of mounting adapter 510 extends from the first side of base plate 510i. The seal pressure ring 510b extends concentrically about stop surface 510f and clearance opening 510a such that stop surface 510f is located between seal pressure ring 510b and clearance opening 510a. The seal pressure ring 510b presses against the gasket seal 37 shown in FIG. 3 to form a seal with electric actuator 30 when electric actuator 30 is attached to the mounting adapter 510. The seal pressure ring 510b also interfaces with the gear housing 31 to prevent rotation of electric actuator 30 about fastener axis 25Ax. Vibration damping clamp 580 further restrains electric actuator 30. Fastener 25 of electric actuator 30 is received by threaded bore 510e that is formed in boss 510d of mounting adapter 510 to attach electric actuator 30 to the mounting adapter 510.

The longitudinal axis of magnet 513 is collinear with the rotational axis 227Ax of trunnion arm 227, and is oriented perpendicular to the magnetic field sensor chip 46. It will be understood that trunnion arm 227 in a drive assembly such as hydraulic pump 571 is used to control the output of the internal hydraulic pump components (not shown) and can move along the axis 227Ax, which may create some variation in the location of trunnion arm 227 along this axis during operation of a vehicle on which hydraulic pump 571 is mounted. The maintenance of a controlled gap between magnet 513 and magnetic sensor chip 46 is important to maintain a consistent signal. A biasing member, namely wave spring 519 which defines an opening through which trunnion arm 227 extends, is used to create a bias force to assist in maintaining this controlled gap. Specifically, wave spring 519 extends between and engages the stop surface 510f and the drive adapter 511 to bias the drive adapter 511 along with trunnion arm 227, specialized fastener 512, and magnet 513 toward the magnetic field sensor chip 46 in order to maintain a controlled gap between the magnet 513 and the sensor chip 46 to ensure sensor signal integrity. To prevent the trunnion arm 227 from moving the magnet 513 outside of the range of the magnetic field sensor chip 46, the wave spring 519 applies a force to the drive adapter 511 and, in turn, the specialized fastener 512 on which the magnet 513 is mounted in order to bias the magnet 513 in position next to the magnetic field sensor chip 46.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A mounting assembly for mounting an electric actuator to a hydraulic drive, the electric actuator having an electric motor, the hydraulic drive having a hydraulic pump disposed in a drive housing and a trunnion arm operatively engaged to the hydraulic pump and extending out of the drive housing through a pilot opening in the drive housing, the mounting assembly comprising:
a mounting adapter comprising:
a base plate configured to be coupled to the drive housing, wherein the base plate defines a clearance opening that enables the trunnion arm to extend therethrough;
a support arm extending from the base plate, the support arm having a proximal end adjacent to the base plate and a distal end; and
a pilot projection extending from the base plate concentrically about the clearance opening, wherein the pilot projection is configured to engage the pilot opening of the drive housing; and
a vibration damping clamp coupled to the distal end of the support arm, the vibration damping clamp configured to extend circumferentially about a housing of the electric motor.

2. The mounting assembly of claim 1, further comprising a cushion disposed on an inner surface of the vibration damping clamp and configured to contact the housing of the electric motor to dampen vibration of the electric motor.

3. The mounting assembly of claim 2, wherein the cushion extends a length along the inner surface of the vibration damping clamp to contact at least half a circumference of the housing of the electric motor.

4. The mounting assembly of claim 1, wherein the vibration damping clamp includes opposing ends, each of which is coupled to the distal end of the support arm.

5. The mounting assembly of claim 4, further comprising a fastener that couples the opposing ends of the vibration damping clamp to the distal end of the support arm.

6. The mounting assembly of claim 5, further comprising a cushion extending between the opposing ends of the vibration damping clamp to engage the housing of the electric motor and dampen vibration of the electric motor.

7. The mounting assembly of claim 1, wherein the support arm is integrally formed with the base plate.

8. The mounting assembly of claim 1, wherein the base plate defines an O-ring groove that extends concentrically about the pilot projection to receive an O-ring.

9. The mounting assembly of claim 1, wherein the mounting adapter further comprises a seal pressure ring extending from the base plate concentrically about the clearance opening, wherein the seal pressure ring is configured to press against a gasket seal to form a seal with a gear housing of the electric actuator.

10. The mounting assembly of claim 9, wherein the base plate further defines a stop surface between the clearance opening and the seal pressure ring to limit axial motion of a drive adapter toward the drive housing.

11. The mounting assembly of claim 1, further comprising a boss configured to be disposed on the base plate, the boss defining a threaded bore to receive a shaft/fastener for coupling the mounting adapter to a gear housing of the electric actuator.

12. A drive assembly having a hydraulic pump disposed in a drive housing to which an electric actuator is mounted, the electric actuator having a gear housing and an electric motor, the drive assembly comprising:
   a trunnion arm extending from the drive housing;
   a drive adapter configured to be coupled to the trunnion arm, and configured to engage an actuator to control the trunnion arm;
   a fastener engaging the drive adapter and received by the trunnion arm to couple the drive adapter to the trunnion arm;
   a magnet mounted to the fastener and positioned adjacent to a magnetic field sensor positioned within the gear housing of the electric actuator;
   a spring engaging the drive adapter to bias the magnet into a positional range adjacent to the magnetic field sensor; and
   a mounting adapter for mounting the electric actuator to the drive housing, wherein the mounting adapter comprises:
      a base plate configured to be coupled to the drive housing, wherein the base plate defines a clearance opening that enables the trunnion arm to extend therethrough;
      a support arm extending from the base plate, the support arm having a proximal end adjacent to the base plate and a distal end;
      a pilot projection extending from the base plate concentrically about the clearance opening, wherein the pilot projection is configured to engage a pilot opening of the drive housing; and
      a vibration damping clamp coupled to the distal end of the support arm, the vibration damping clamp configured to extend circumferentially about a housing of the electric motor.

13. The drive assembly of claim 12, wherein the mounting adapter defines a stop surface extending circumferentially about the clearance opening, the spring engaging the stop surface to enable the spring to bias the magnet mounted to the fastener into the positional range.

14. The drive assembly of claim 13, wherein the spring is positioned between and is configured to bear against the drive adapter and the stop surface of the mounting adapter.

15. An assembly for mounting an electric actuator to a hydraulic drive, the electric actuator having an electric motor and a gear housing, the hydraulic drive including a hydraulic pump disposed in a drive housing and a trunnion arm operatively engaged to the hydraulic pump and extending out of the drive housing through a pilot opening in the drive housing, the assembly comprising:
   a mounting adapter comprising:
      a base plate configured to be coupled to the drive housing, wherein the base plate defines a clearance opening that enables the trunnion arm to extend therethrough, wherein the base plate further defines a stop surface extending circumferentially about the clearance opening;
      a support arm extending from the base plate, the support arm having a proximal end adjacent to the base plate and a distal end;
      a pilot projection extending from the base plate concentrically about the clearance opening, wherein the pilot projection is configured to engage the pilot opening of the drive housing; and
      a vibration damping clamp coupled to the distal end of the support arm, the vibration damping clamp configured to extend circumferentially about a housing of the electric motor:
   a drive adapter connected to the trunnion arm by a fastener;
   a magnet mounted to the fastener; and
   a spring positioned between and engaging the stop surface of the mounting adapter and the drive adapter, the spring biasing the drive adapter in a direction away from the mounting adapter to position the magnet next to a magnetic field sensor positioned within the gear housing of the electric actuator.

16. The assembly of claim 15, wherein the spring is a wave spring.

17. The assembly of claim 15, further comprising a cushion that is configured to be disposed between an inner surface of the vibration damping clamp and the housing of the electric motor to dampen vibration of the electric motor.

* * * * *